United States Patent [19]

Krom et al.

[11] Patent Number: 5,036,427
[45] Date of Patent: Jul. 30, 1991

[54] DRAWOUT CIRCUIT BREAKER APPARATUS

[75] Inventors: Thomas J. Krom; Leonard G. Casillo, both of Seneca, S.C.

[73] Assignee: Square D Company, Palatine, Ill.

[21] Appl. No.: 395,113

[22] Filed: Aug. 16, 1989

[51] Int. Cl.⁵ .................. H01H 9/20; H02B 11/12
[52] U.S. Cl. ........................ 361/339; 200/50 AA
[58] Field of Search ......................... 200/50 AA; 361/335–339, 342

[56] References Cited

U.S. PATENT DOCUMENTS

| | | | |
|---|---|---|---|
| 2,264,755 | 12/1941 | Johnson et al. | 200/293 |
| 2,711,452 | 6/1955 | Spencer et al. | 200/50 AA |
| 2,777,024 | 1/1957 | West | 200/50 AA |
| 3,663,773 | 5/1972 | Powell | 200/50 AA |
| 3,804,998 | 4/1974 | Rexroad et al. | 200/50 AA |
| 3,923,197 | 12/1975 | Kuhn | 220/344 |
| 3,983,460 | 9/1976 | Kuhn et al. | 361/344 |
| 3,991,291 | 11/1976 | McGuffie et al. | 200/50 A |
| 4,002,864 | 1/1977 | Kuhn et al. | 200/50 AA |
| 4,002,865 | 1/1977 | Kuhn et al. | 200/50 AA |
| 4,017,698 | 4/1977 | Kuhn et al. | 200/50 AA |
| 4,101,744 | 7/1978 | Wilson | 200/50 AA |
| 4,112,269 | 9/1978 | Nelson et al. | 200/50 AA |
| 4,121,067 | 10/1978 | Rexroad et al. | 200/50 AA |
| 4,139,748 | 2/1979 | Wolfe et al. | 200/50 AA |
| 4,146,764 | 3/1979 | Wilson | 200/400 |
| 4,146,765 | 3/1979 | Wilson | 74/625 |
| 4,205,207 | 5/1980 | Clausing | 200/50 AA |
| 4,412,112 | 10/1983 | Ishikawa et al. | 200/50 AA |
| 4,486,814 | 12/1984 | Ishikawa et al. | 361/339 |
| 4,491,896 | 1/1985 | Rickmann | 361/339 |
| 4,531,174 | 7/1985 | Rickmann | 361/339 |
| 4,703,137 | 10/1987 | Bohnen et al. | 200/50 AA |
| 4,761,521 | 8/1988 | Beck et al. | 200/50 AA |
| 4,768,131 | 8/1988 | Schultz et al. | 361/338 |

*Primary Examiner*—J. R. Scott
*Attorney, Agent, or Firm*—David R. Stacey; David R. Price

[57] ABSTRACT

An apparatus comprising a compartment including a frame, a pair of contacts supported by the frame, a first rail which is fixed to the frame and which has an end, and a second rail supported by pivotal movement relative thereto between a horizontal position wherein the second rail extends forwardly from the end of the first rail and in substantially colinear relation to the first rail, and a vertical position wherein the second rail extends in transverse relation to the first rail, and a drawout circuit breaker assembly including a circuit breaker having thereon a pair of contacts, the assembly being movable along the first and second rails when the second rail is in the horizontal position, being movable along the first rail so as to move the circuit breaker assembly contacts into and out of engagement with the compartment contacts, and being movable entirely onto the first rail so that the second rail is movable from the horizontal position to the vertical position.

29 Claims, 12 Drawing Sheets

DRAWOUT CIRCUIT BREAKER APPARATUS

BACKGROUND OF THE INVENTION

The invention relates to circuit breakers, and more particularly to drawout circuit breakers and apparatus, such as switchboards, containing drawout circuit breakers.

U.S. Pat. No. 4,728,757 discloses a drawout circuit breaker apparatus including a circuit breaker assembly having thereon wheels 26 that run on a track 25 supported by a switchboard compartment 27. Circuit breaker contacts are moved into and out of engagement with compartment contacts by a drawout mechanism that is operated by a crank 48 inserted through a window 40 in the front wall of the circuit breaker assembly. This arrangement is typical of prior art drawout circuit breaker apparatus.

SUMMARY OF THE INVENTION

The invention provides a switchboard apparatus comprising a compartment, a drawout circuit breaker assembly, and an improved arrangement for supporting and moving the circuit breaker assembly relative to the compartment. This arrangement makes it extremely simple to replace the circuit breaker assembly and also includes many improved safety features.

The compartment includes a box-like frame with an open front and a rear wall having thereon six primary contacts or stabs. The frame also has spaced side walls, each of which has thereon a generally horizontal, fixed, rearward rail and a forward rail which is pivotable between a horizontal position in which the forward rail extends forwardly from the forward end of the rearward rail, and a vertical position in which the forward rail extends generally vertically adjacent the forward end of the rearward rail. The compartment also includes, on each of the fixed rails, a yoke that rolls along the fixed rail, that has therein a slot and that has thereon a plurality of secondary contacts. As explained hereinafter, the circuit breaker assembly can be selectively connected to the yokes so that the circuit breaker assembly moves with the yokes along the fixed rails. The compartment also includes an operating handle that extends forwardly from the forward rails and that is secured to the forward rails for common pivotal movement therewith. The compartment also includes a linkage extending between each forward rail and the associated yoke for moving the yoke rearwardly along the associated fixed rail in response to upward pivotal movement of the associated forward rail and for moving the yoke forwardly along the associated fixed rail in response to downward pivotal movement of the associated forward rail. In other words, the yokes move rearwardly in response to upward pivotal movement of the operating handle and move forwardly in response to downward pivotal movement of the operating handle. The compartment also includes, on each side wall, a limit bracket.

The switchboard apparatus also comprises a circuit breaker assembly having thereon wheels or rollers that are movable along the forward rails and the rearward rails when the forward rails are in their horizontal positions and that are movable along only the rearward rails when the forward rails are in their vertical positions. The circuit breaker assembly includes a circuit breaker having thereon six primary contacts or jaw mechanisms, each of which is engageable with a respective one of the primary stabs of the compartment. The circuit breaker also has therein vents and has thereon a trip lever and a conventional operating handle. The circuit breaker assembly also includes a vertically movable, vertically extending bar on each side of the assembly. Each bar has thereon a horizontally extending pin and has thereon a plurality of secondary contacts. The bars are movable between upper positions and lower positions. Downward movement of each bar moves the pin into the slot in the associated yoke and moves the secondary contacts on the bar into engagement with the secondary contacts on the associated yoke. Movement of the pins into the slots connects the circuit breaker assembly to the yokes so that the circuit breaker assembly moves with the yokes. Furthermore, the upper end of each bar is engageable with the associated limit bracket when the bars are in their upper positions. When the bars are in their lower positions, the upper ends of the bars can pass beneath the limit brackets. The circuit breaker assembly also includes a handle or bail, and a linkage for moving the bars downwardly in response to upward movement of the bail and for moving the bars upwardly in response to downward movement of the bail.

The circuit breaker assembly is movable relative to the compartment between a withdrawn position, a test position, and an engaged position. In the test position, the pins on the bars are vertically aligned with the slots in the yokes, the circuit breaker secondary contacts are vertically aligned with the compartment secondary contacts, and the circuit breaker primary contacts are spaced from the compartment primary contacts. In the engaged position, the circuit breaker primary contacts are engaged with the compartment primary contacts.

The circuit breaker assembly can be manually moved from the withdrawn position to the test position, but, when the bail is in its lower position, engagement of the limit brackets by the bars prevents manual movement of the circuit breaker assembly from the test position to the engaged position. (If the assembly is manually moved toward the test position when the bail is in its upper position, engagement of the yokes by the pins prevents movement of the assembly to the test position or beyond.) When the circuit breaker assembly is in the test position, movement of the bail to its upper position connects the circuit breaker assembly to the yokes by moving the pins into the slots and permits movement of the circuit breaker assembly to the engaged position by moving the upper ends of the bars beneath the limit brackets. Once the circuit breaker assembly is connected to the yokes, the circuit breaker assembly can be moved to the engaged position only by moving the operating handle and the forward rails upwardly. Once the circuit breaker assembly is in the engaged position, it can be removed from the engaged position only by moving the operating handle and the forward rails downwardly.

The switchboard apparatus also comprises a mechanism for indicating the position of the circuit breaker assembly and/or the condition of the apparatus. Specifically, this mechanism includes a cam member or indicator movably supported by the circuit breaker assembly for movement between a first position in which the indicator indicates the withdrawn position of the circuit breaker assembly, a second position in which the indicator indicates the test position of the circuit breaker assembly, a third position in which the indicator indicates that the pins have moved into the slots and that the secondary contacts are in engagement, and a fourth position in which the indicator indicates the engaged position of the circuit breaker assembly. The mechanism also includes a spring biasing the indicator to its first position, a surface on the compartment for moving the indicator to its second position in response to movement of the circuit breaker assembly to the test position, a surface on the bail for moving the indicator to its third position in response to movement of the bail to its upper position, and a surface on the compartment for moving the indicator to its fourth position in response to movement of the circuit breaker assembly to the engaged position.

The apparatus also comprises an insulated exhaust chamber which communicates with the vents in the circuit breaker, which is directly supported solely by the circuit breaker assembly and which opens rearwardly to the atmosphere. This arrangement increases operator safety, because the apparatus does not vent forwardly.

The apparatus also comprises a mechanism for moving the trip lever to its tripped position in response to movement of the circuit breaker assembly to and from the engaged position. Preferably this mechanism includes a ramp-like member which is mounted inside the compartment and which engages the trip lever in response to movement of the circuit breaker assembly to and from the engaged position. Once the circuit breaker assembly has been moved to or from the engaged position, the circuit breaker operating handle must be moved to its closed position in order to close the circuit breaker. This also increases safety.

The apparatus further comprises a locking member which is mounted on the circuit breaker assembly and which is movable between an unlocking position wherein the locking member permits movement of the circuit breaker operating handle to its circuit closed position, and a locking position wherein the locking member prevents movement of the circuit breaker operating handle to its circuit closed position. The apparatus further comprises a slide member mounted on the circuit breaker assembly for movement between an extended position and a retracted position. The locking member cannot be moved to the locking position unless the slide member is in the extended position, and the circuit breaker assembly cannot be moved to and from the engaged position when the slide member is in the extended position. Thus, the circuit breaker assembly cannot be moved to or from the engaged position while the circuit breaker operating handle is locked open. This also increases safety. The apparatus further comprises either a padlock or a key mechanism for locking the locking member in the locking position.

Other features and advantages of the invention will become apparent to those skilled in the art upon review of the following detailed description, claims and drawings.

Figure 1:
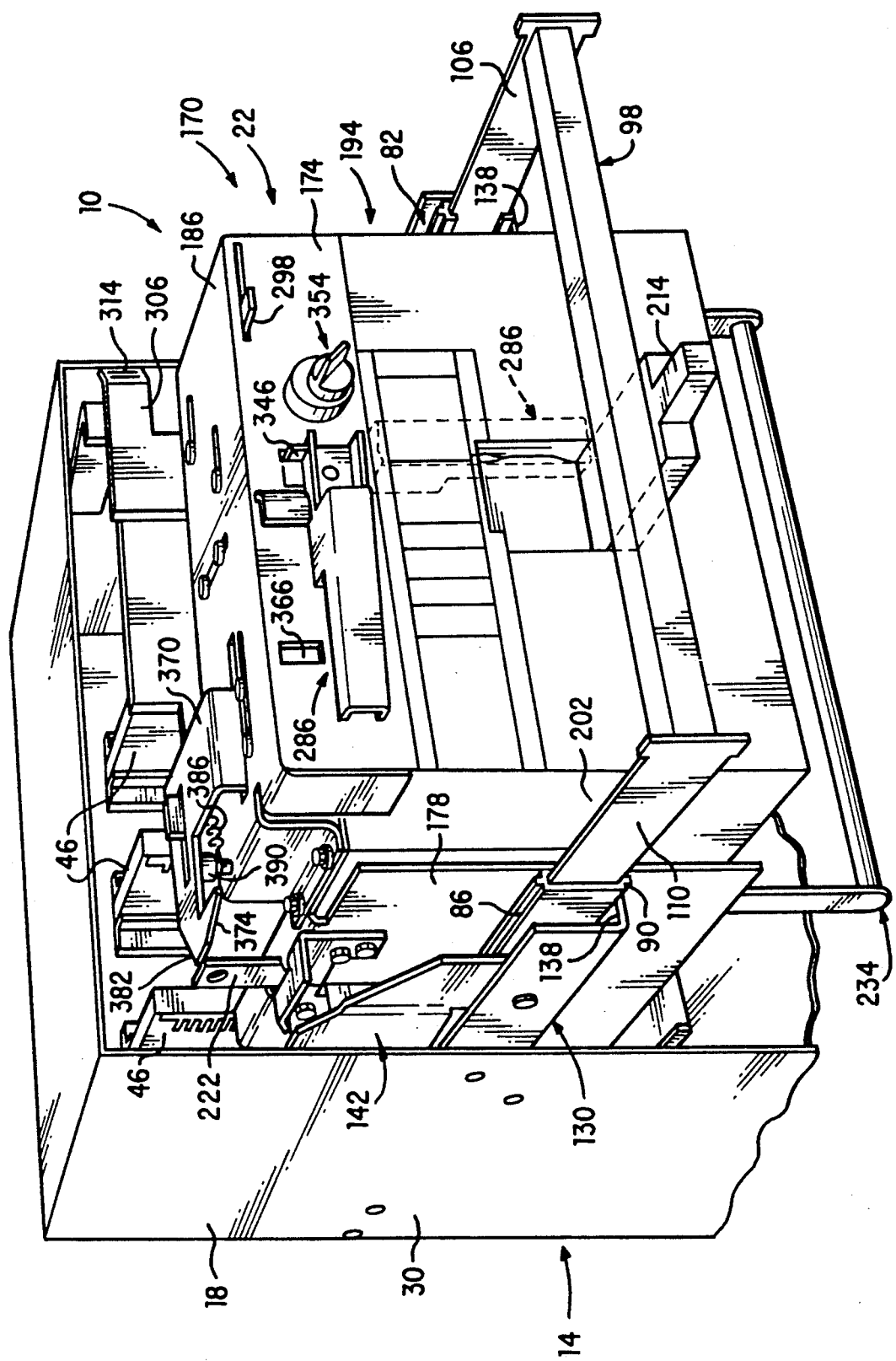
FIG. 1 is a front perspective view of a switchboard apparatus embodying the invention and comprising a compartment and a circuit breaker assembly.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A switchboard apparatus 10 embodying the invention is illustrated in the drawings. While the illustrated embodiment of the invention is a switchboard apparatus, it should be understood that the invention could be embodied in other types of electrical apparatus.

The apparatus 10 comprises (see FIG. 1) a cabinet 14 (partially shown) which, in the preferred embodiment, includes a plurality of substantially identical modular, stackable compartments 18. The apparatus 10 also comprises a plurality of substantially identical drawout circuit breaker assemblies 22, each of which is insertable into a respective one of the compartments 18. One compartment 18 and the associated circuit breaker assembly 22 are described hereinafter.

Figure 2:
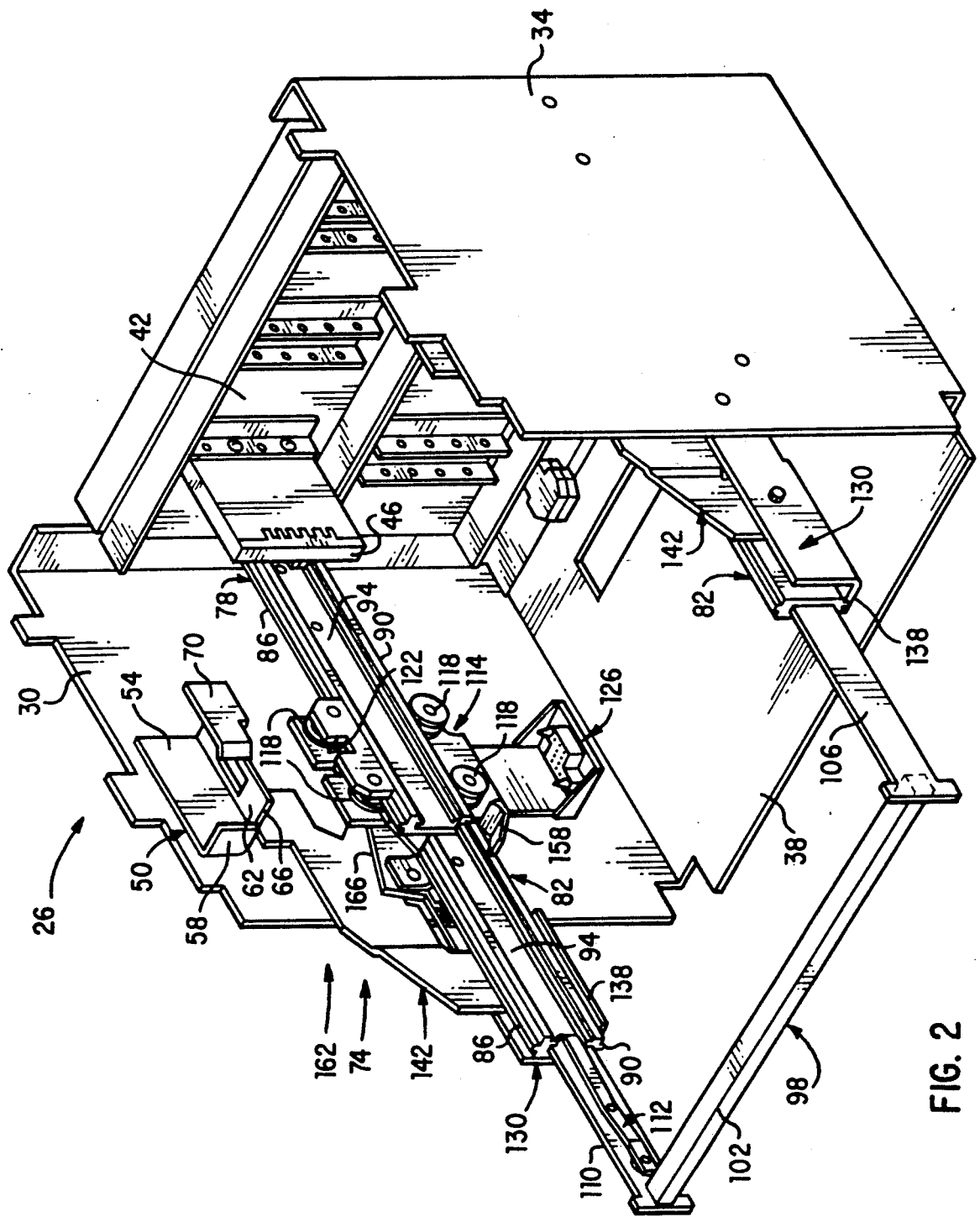
FIG. 2 is a perspective view of the compartment.

The compartment 18 includes (see FIG. 2) a frame 26 comprising opposite left and right or first and second generally parallel side walls 30 and 34, respectively, a bottom wall 38 extending between the side walls 30 and 34, and a rear wall 42 extending between the side walls 30 and 34. As is known in the art, the rear wall 42 has mounted thereon six compartments primary contacts or stabs 46 (only one is shown in FIG. 2), two for each of three phases.

Each side wall 30 or 34 has fixedly mounted thereon a limit bracket 50. The limit bracket 50 includes a vertical portion 54 fixed to the associated side wall 30 or 34. The vertical portion 54 has thereon a generally vertical, inwardly extending projection 58, and a generally horizontal, inwardly extending projection 62. The horizontal projection 62 defines a stop surface 66 and has thereon a generally vertical, upwardly extending projection 70 spaced from the vertical portion 54 of the limit bracket 50. The reason for the limit bracket 50 is explained hereinafter.

Figure 3:
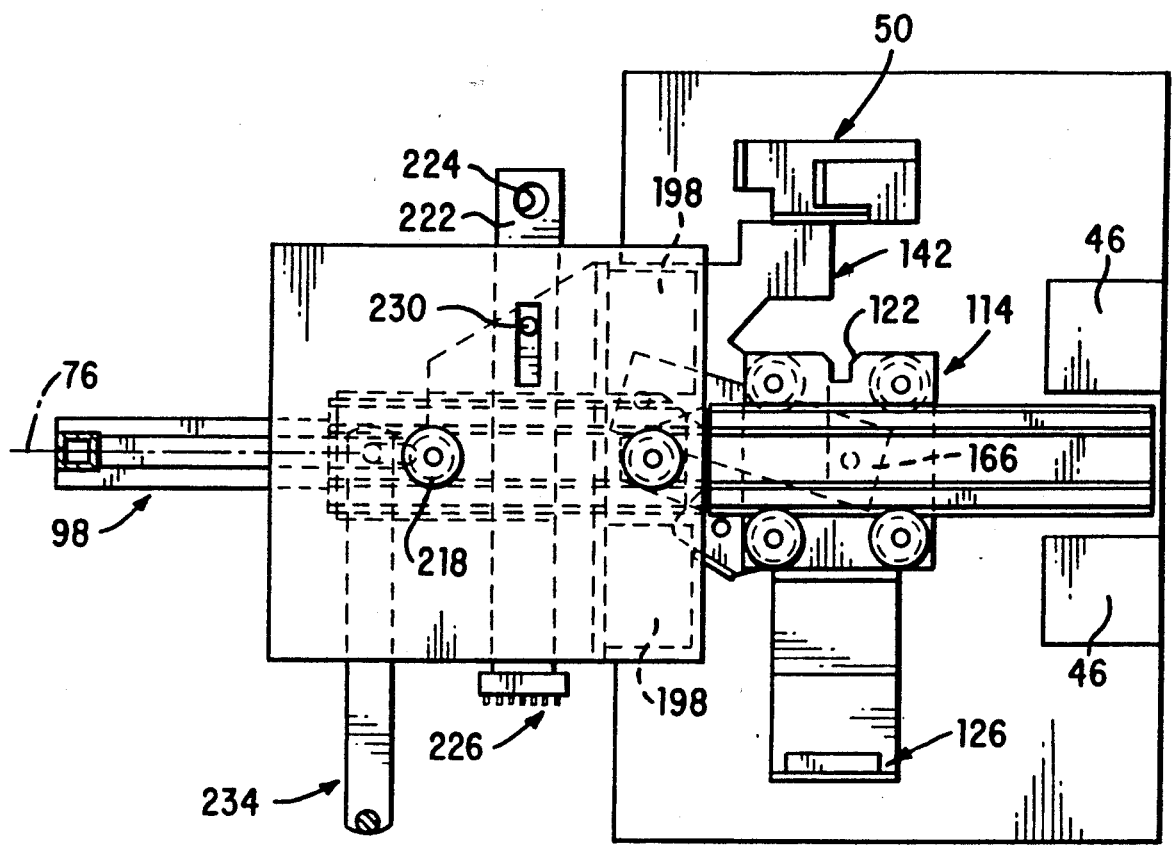
FIG. 3 is a partially schematic side elevational view of the apparatus in its "withdrawn" condition.
Figure 10:
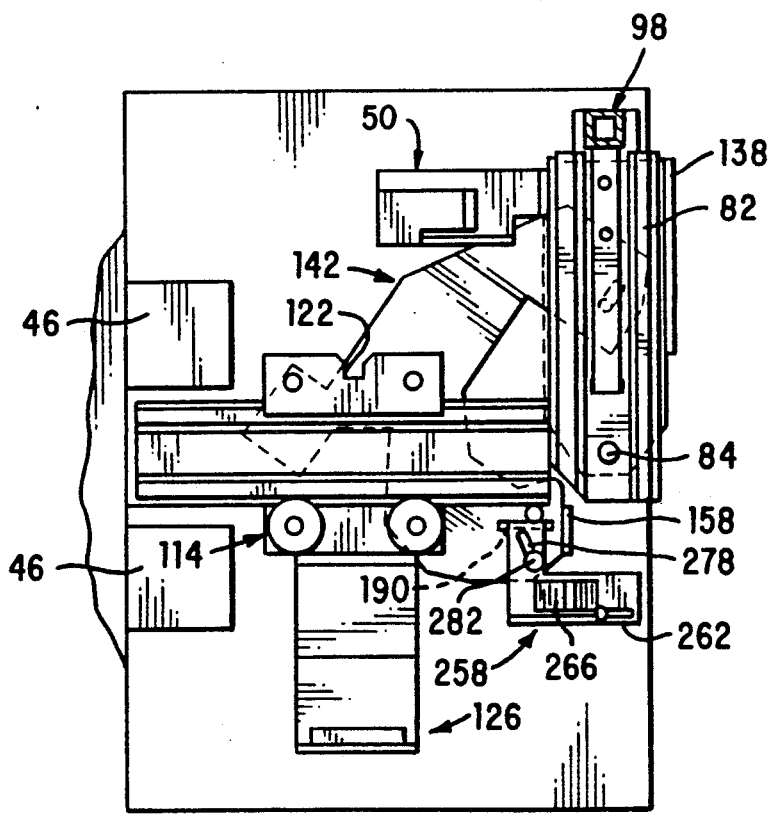
FIG. 10 is a view similar to FIG. 9 with the apparatus in the "connect" condition.

The compartment 18 also includes means 74 for supporting the circuit breaker assembly 22 relative to the frame 26 and for moving the circuit breaker assembly 22 relative to the frame 26 and along an axis 76 (FIG. 3). Preferably, the means 74 includes a generally horizontal first or rearward rail 78 (see FIG. 2) fixedly mounted on each side wall 30 or 34. The means 74 also includes a second or forward rail 82 mounted on each side wall 30 or 34 for pivotal movement relative thereto and about an axis 84 (FIG. 10) that is generally perpendicular to the axis 76. Each forward rail 82 is pivotally movable between horizontal position (FIGS. 2-5) wherein the rail 82 extends forwardly from the forward end of the associated rearward rail 78 and in substantially colinear relation to the rearward rail 78, and a vertical position (FIGS. 6-8) wherein the forward rail 82 extends in transverse relation to the associated rearward rail 78. The limit brackets 50 prevent pivotal movement of the associated forward rails 82 beyond their vertical positions, and the below-described gusset levers prevent movement of the associated forward rails 82 beyond their horizontal positions. The limit brackets 50 and the gusset levers thus restrict movement of the forward rails 82 to a range of approximately 90°. Each of the forward and rearward rails 82 and 78 defines (see FIG. 2) an upper track 86, a lower track 90 and an inner track 94.

Figure 6:
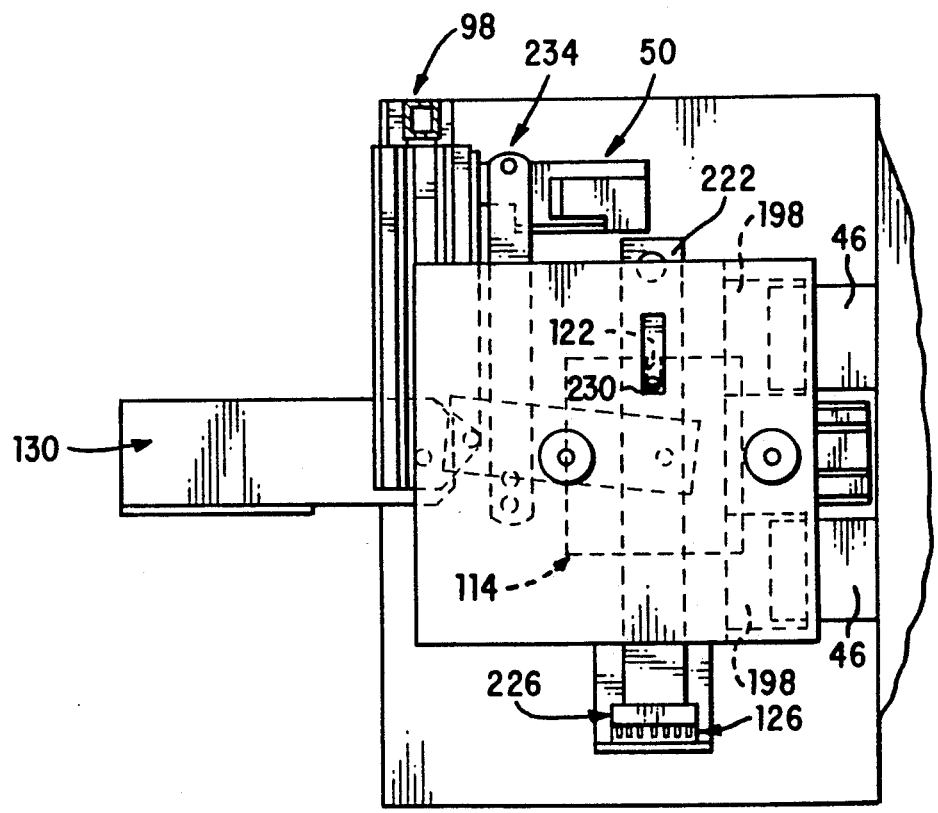
FIG. 6 is a partially schematic side elevational view of the apparatus in its "preconnect" condition.
Figure 7:
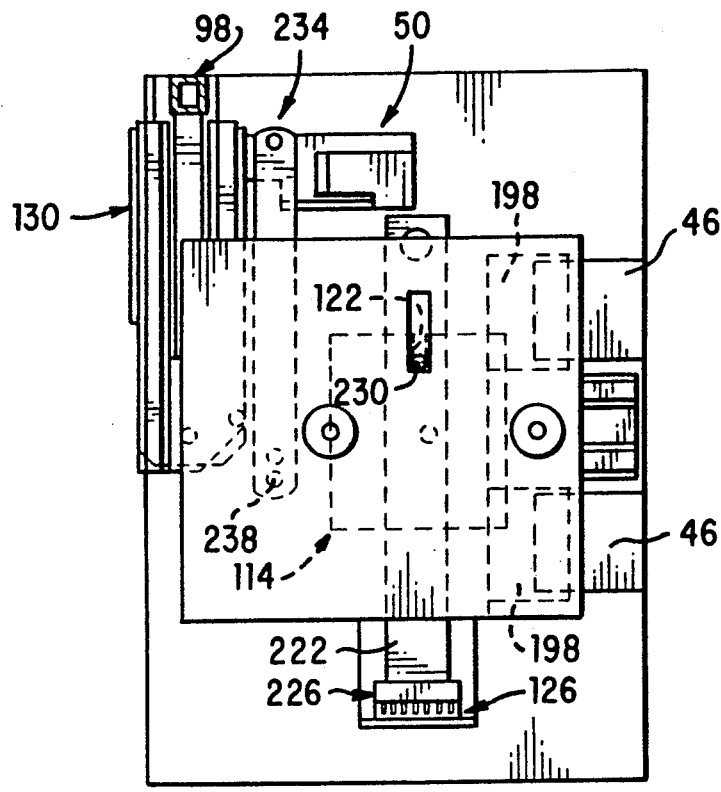
FIG. 7 is a partially schematic side elevational view of the apparatus in its "connect" condition.
Figure 8:
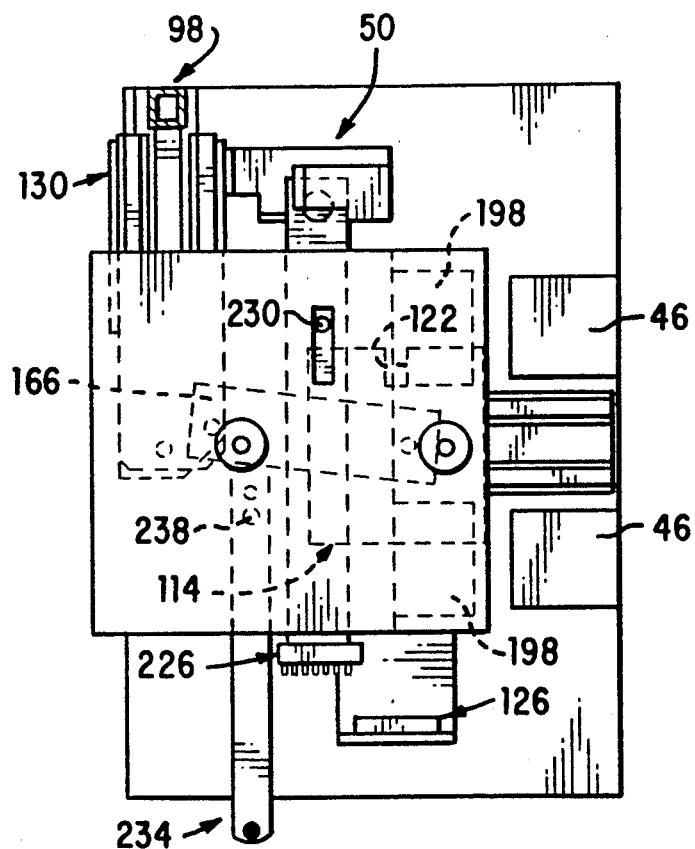
FIG. 8 is a partially schematic side elevational view of the apparatus in its "store" condition.

The means 74 also includes an operating handle 98 supported by the forward rails 82 for common pivotal movement therewith about the axis 84. In the preferred embodiment, the operating handle 98 includes a main portion 102 extending generally horizontally and between the rails 82, a right connecting portion 106 that extends from the right end of the main portion 102 and that is removably connectable by an operating handle retainer 112 to the right forward rail 82, and a left connecting portion 110 that extends from the left end of the main portion 102 and that is selectively connectable to the left forward rail 82. More particularly, the connecting portions 106 and 110 slidably extend into the inner tracks 94 of the forward rails 82 and are linearly movable relative to the forward rails 82 between an extended position (FIGS. 2-5) and a retracted position (FIGS. 6-8). Because the forward rails 82 are limited to pivotal movement through an arc of approximately 90°, the handle 98 is also limited in pivotal movement to an arc of approximately 90°.

The means 74 also includes a yoke 114 mounted on each rearward rail 78 for translational movement relative thereto between a forward position and a rearward position. Each yoke 114 is supported for movement along the associated rail 78 by four wheels or rollers 118. Specifically, each yoke 114 has thereon two rollers 118 that ride on the upper track 86 of the associated rail 78 and two rollers 118 that ride on the lower track 90 of the associated rail 78. The yoke 114 has an upper end having therein a generally vertically extending slot 122, and the yoke 114 also has a lower end. As explained hereinafter, the circuit breaker assembly 22 can be selectively connected to the yokes 114 so that the assembly 22 moves with the yokes 114 along the rails 78.

As is known in the art, the compartment 18 also includes a plurality of secondary contacts 126. The secondary contacts 126 take the primary current supplied by the circuit breaker assembly 22 and distribute it to other equipment (not shown). Preferably, the secondary contacts 126 are mounted on the lower end of each of the yokes 114.

The compartment 18 also includes a gusset lever 130 mounted on each side wall 30 or 34 for pivotal movement relative thereto about the axis 84. The gusset lever 130 is movable relative to the side wall between a raised or upper position (FIGS. 7 and 8) and a lower position (FIGS. 2-5). The gusset lever 130 has thereon an inward extension 138 which abuts the associated forward rail 82 and supports the associated forward rail 82 in its horizontal position. Therefore, the gusset lever 130 must be in its lower position in order for the associated forward rail 82 to be in its horizontal position.

Figure 9:
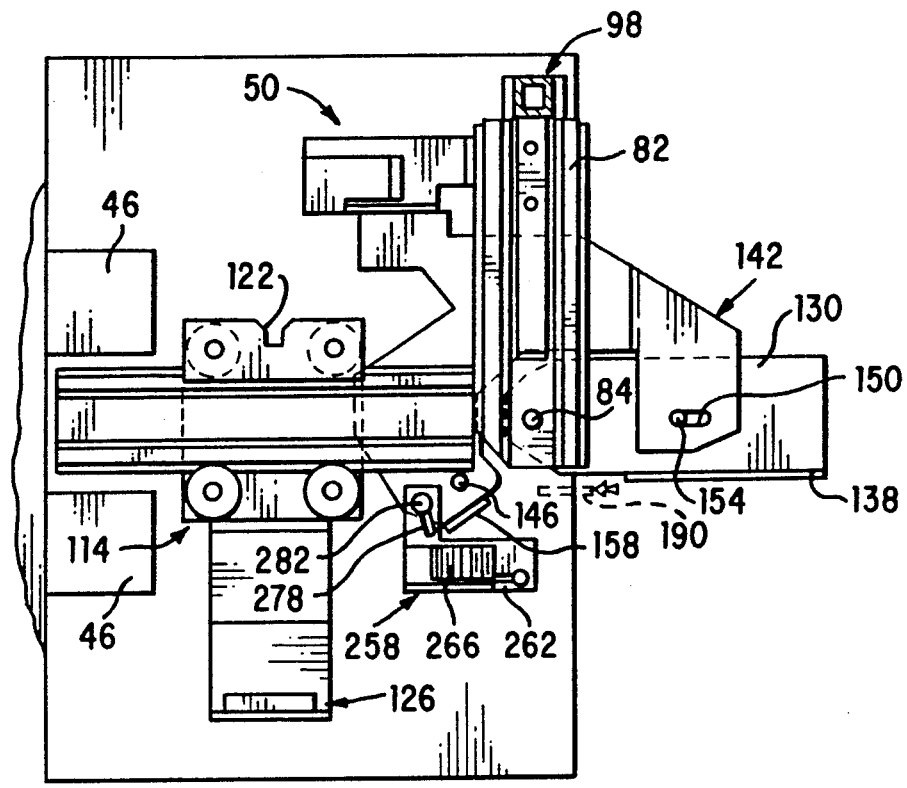
FIG. 9 is a side elevational view of the inside of the right wall of the compartment with the apparatus in the "preconnect" condition.

The compartment 18 also includes a lever 142 mounted on each side wall 30 or 34 for pivotal movement relative thereto and for substantially common pivotal movement with the associated gusset lever 130. More particularly, the lever 142 is mounted for pivotal movement about an axis 146 (FIG. 9) spaced from the gusset lever axis 84, and the lever 142 has therein a slot 150 (FIG. 9) that receives a pin 154 extending from the gusset lever 130 so that pivotal movement of the gusset lever 130 causes pivotal movement of the lever 142. The lever 142 has thereon an inward extension 158 (FIG. 2), the reason for which is explained hereinafter. The lever 142 engages the limit bracket 50 when the gusset lever 130 is in both the upper and lower positions (see FIGS. 9 and 10) so that the limit bracket 50 prevents upward movement of the gusset lever 130 beyond the upper position and prevents downward movement of the gusset lever 130 beyond the lower position.

The apparatus 10 also comprises means 162 operative in response to movement of the forward rails 82 into and out of their upper or retracted positions for moving the circuit breaker assembly 22 along the rearward rails 78 so as to move the below-described circuit breaker contacts into and out of engagement with the compartment contacts or stabs 46. Since the operating handle 98 is connected to the forward rails 82 for common movement therewith, the means 162 also moves the circuit breaker assembly 22 relative to the compartment frame 26 in response to pivotal movement of the operating handle 98. While various suitable means can be employed, in the preferred embodiment, the means 162 includes means for moving the yokes 114 relative to the compartment frame 26 in response to movement of the forward rails 82. Preferably, such means includes, for each of the yokes 114, a link 166 (FIG. 3) having a forward end pivotally connected to the associated forward rail 82, and a rearward end pivotally connected to the yoke 114 so that upward pivotal movement of the forward rail 82 causes rearward movement of the yoke 114, and so that downward pivotal movement of the forward rail 82 causes forward movement of the yoke 114. The means 162 for moving the circuit breaker assembly 22 also includes means for selectively connecting the circuit breaker assembly 22 to the yokes 114, and thus to the rearward ends of the links 166, for common movement therewith. This means is described in detail hereinafter.

Figure 19:
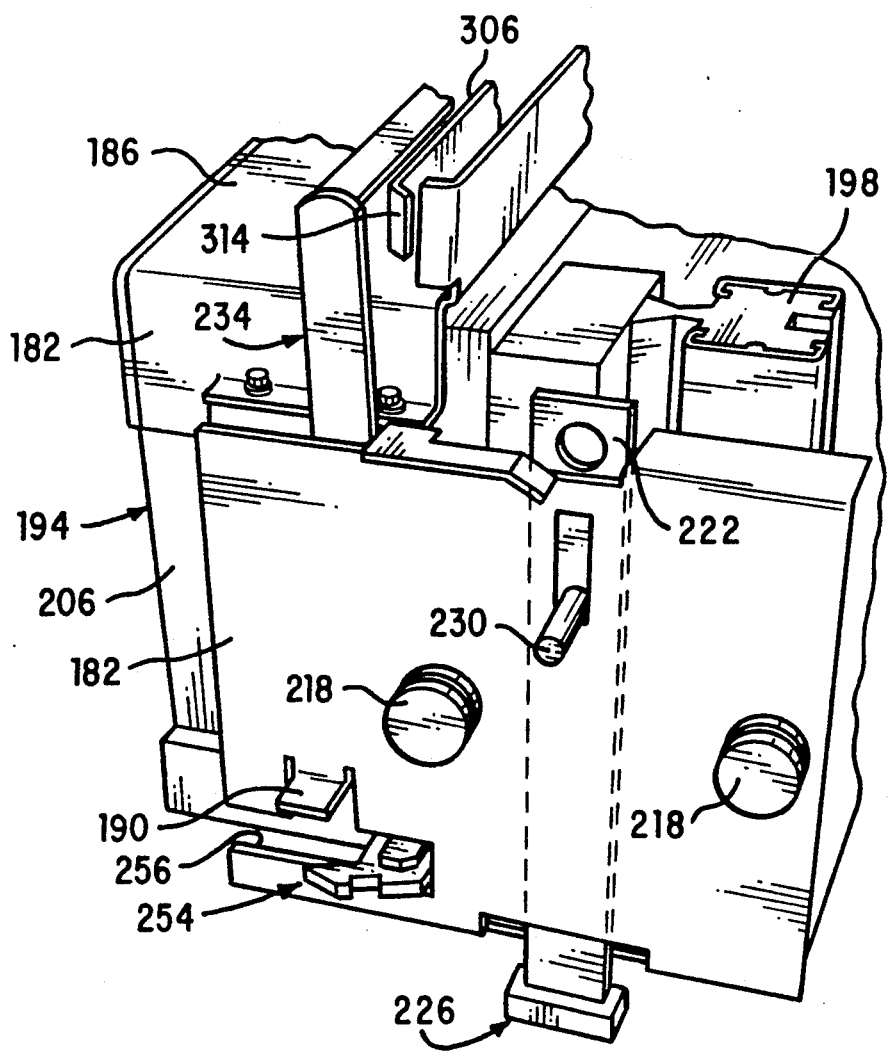
FIG. 19 is a partial perspective view of the right side of the circuit breaker assembly.

The circuit breaker assembly 22 includes a frame 170 (FIG. 1) comprising a front wall 174, opposite first and second or left and right side walls 178 and 182 respectively facing the left and right side walls 30 and 34 of the compartment 26, and a top wall 186. Each side wall 178 or 182 has thereon an outwardly extending projection 190 (FIG. 19), the reason for which is explained hereinafter. The frame 170 surrounds and supports a Square D Company NE molded-case circuit breaker 194 that is modified in a conventional manner so that the rear wall 200 thereof has extending therefrom six circuit breaker primary contacts 198, each of which is a conventional jaw mechanism adapted to engage a respective one of the compartment primary contacts or stabs 46 of the compartment 18. The circuit breaker 194 includes opposite left and right side walls 202 (FIG. 1) and 206 (FIG. 19) respectively facing the left and right side walls 178 and 182 of the frame 170. Each of the circuit breaker side walls 202 and 206 has therein a vent 210. The front wall of the circuit breaker 194 has thereon a conventional operating handle or lever 214.

Each of the side walls 178 and 182 of the circuit breaker assembly 22 has rotatably mounted thereon a plurality of wheels or rollers 218 (FIG. 9) adapted to ride in the inner track 94 of the associated forward and rearward rails 82 and 78. The circuit breaker assembly 22 can be rolled along both the forward rails 22 and the rearward rails 78 only when the forward rails 82 are in their horizontal positions and can be rolled along only the rearward rails 78 when the forward rails 82 are in their vertical positions.

The circuit breaker assembly 22 also includes left and right vertically extending members 222 respectively supported by the side walls 178 and 182. Each vertical member 222 has an upper end extending upwardly from the upper wall 186 of the circuit breaker assembly 22 and a lower end extending downwardly from the lower wall of the circuit breaker assembly 22. The upper end of each bar has therein an aperture 224 that facilitates lifting of the circuit breaker assembly 22. The lower end of each vertical member 222 carries a plurality of conventional circuit breaker secondary contacts 226 that are movable into and out of engagement with the secondary contacts 126 on the associated yoke 114. Each vertical member 222 also has thereon a horizontally and outwardly extending pin 230 that is movable into and out of the slot 122 in the associated yoke 114.

Figure 4:
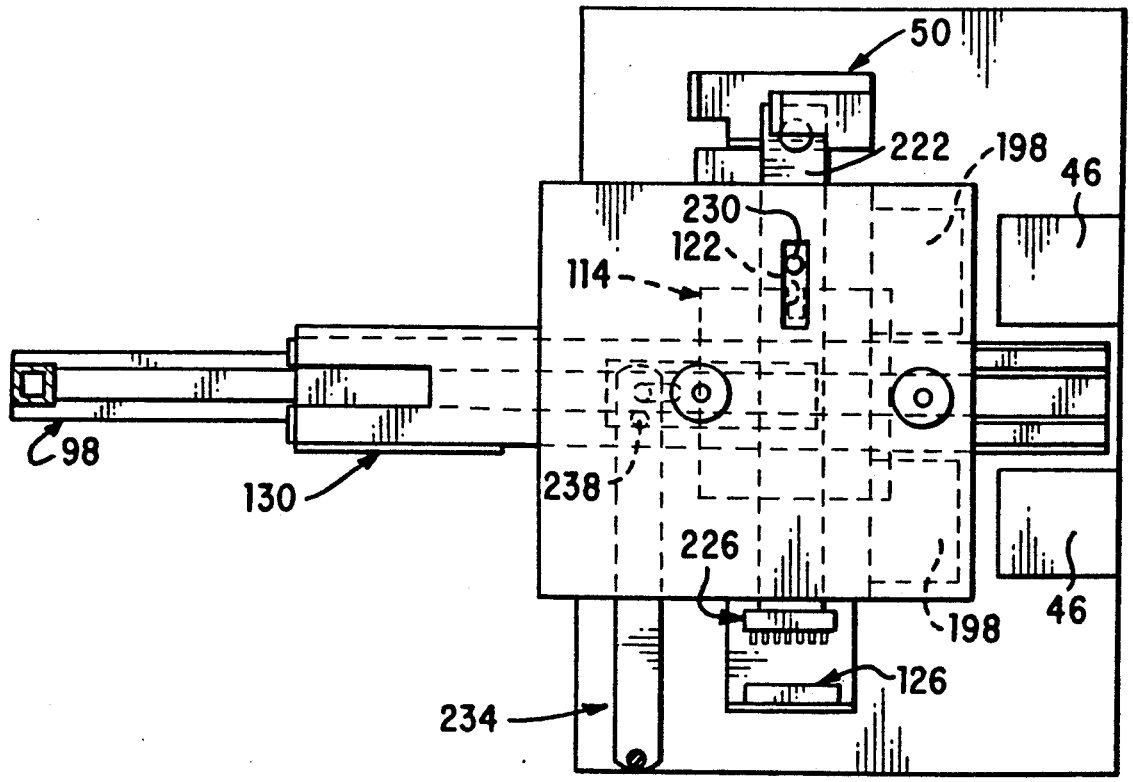
FIG. 4 is a partially schematic side elevational view of the apparatus in its "disconnect" condition.
Figure 5:
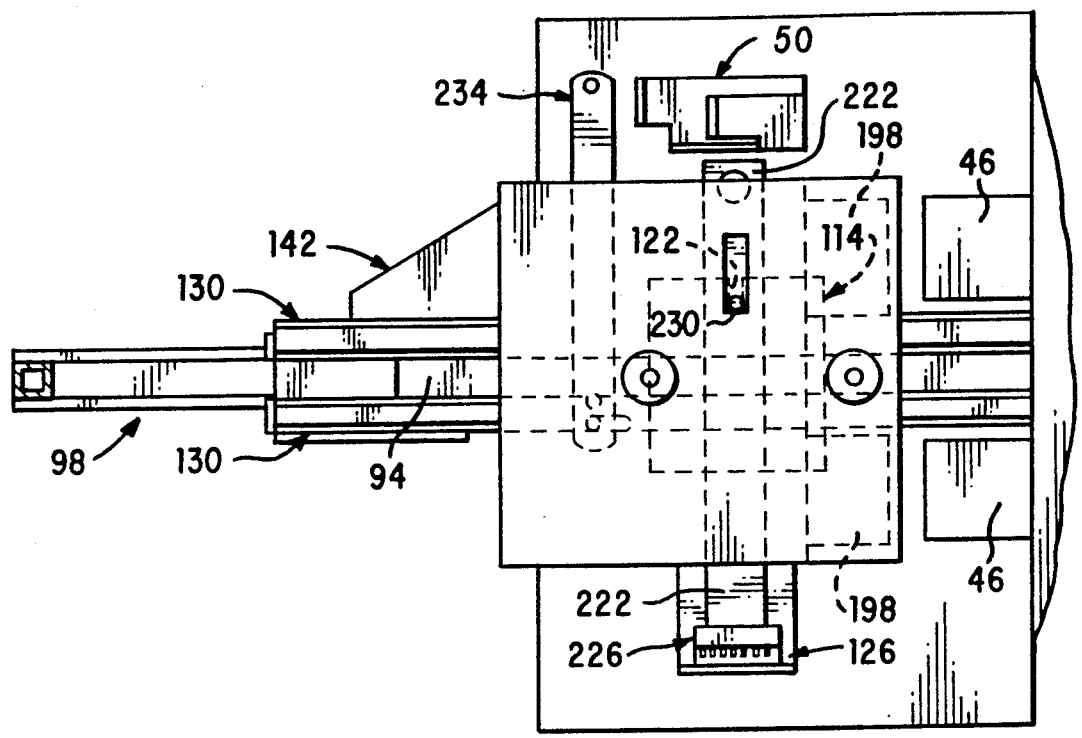
FIG. 5 is a partially schematic side elevational view of the apparatus in its "test" condition.

Each vertical member 222 is vertically movable relative to the circuit breaker assembly frame 170 between an upper position (FIGS. $5 \geqq 7$) and a lower position (FIGS. 2-4). When the vertical member 222 is in its upper position, the upper end of the bar 222 is engageable with the stop surface 66 on the associated limit bracket 50, the pin 230 is located on a horizontal line extending above the associated yoke 114, and the secondary contacts 226 on the vertical member 222 are located in a horizontal plane extending above the secondary contacts 126 on the yoke 114. When the vertical member 222 is in its lower position, the upper end of the vertical member 222 can pass beneath the horizontal portion 62 of the associated limit bracket 50. Furthermore, if the pin 230 is aligned with the associated slot 122 when the vertical member 222 is moved from its upper position to its lower position, the pin 230 moves downwardly into the slot 122 and the secondary contacts 226 on the vertical member 222 move into engagement with the secondary contacts 126 on the yoke 114. Thus, the pins 230 and the slots 122 constitute means for connecting the circuit breaker assembly 22 to the yokes 114 in response to movement of the vertical members 222 to their lower positions.

Figure 20:
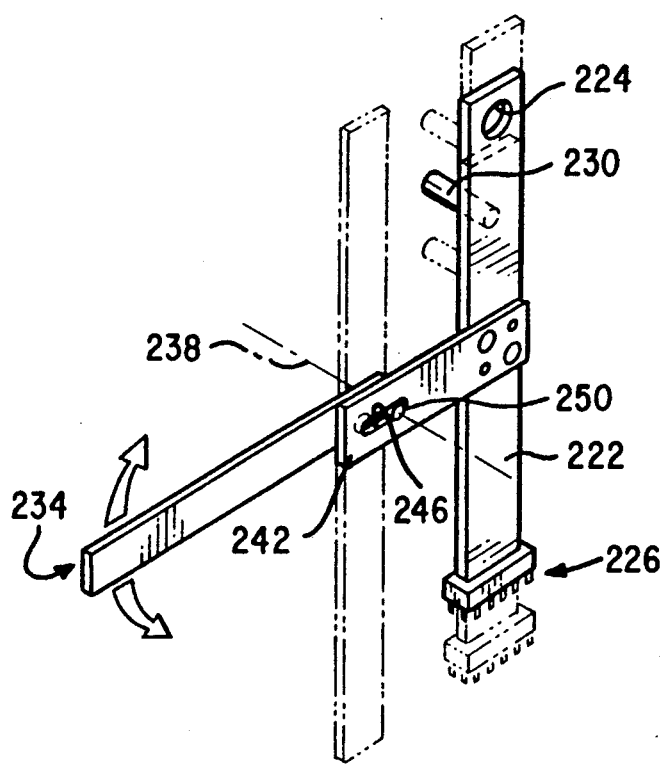
FIG. 20 is a partial perspective view of the circuit breaker assembly.

The circuit breaker assembly 22 also includes therefore bail 234 (FIG. 4) mounted on the circuit breaker assembly frame 170 for pivotal movement relative thereto about a generally horizontal axis 238 and between an upper position (FIGS. 5-7) and a lower position (FIGS. 2-4). The circuit breaker assembly 22 further includes means operative in response to movement of the bail 234 for moving the circuit breaker secondary contacts 226 into and out of engagement with the compartment secondary contacts 126, and for connecting the circuit breaker assembly 22 to the yokes 114. Preferably, this means includes means for moving the vertical members 222 from their upper positions to their lower positions in response to movement of the bail 234 from its lower position to its upper position, and for moving the vertical members 222 from their lower positions to their upper positions in response to movement of the bail 234 from its upper position to its lower position. In the preferred embodiment, each of the vertical members 222 has fixedly attached thereto a forwardly extending member 242 (FIG. 20) having therein a slot 246, and the associated bail 234 has thereon an inwardly extending pin 250 received in the slot 246. Pivotal movement of the bail 234 causes vertical movement of the pin 250, which vertical movement acts through the associated member 242 to cause vertical movement of the associated vertical member 222. Thus, the bail 234, the bars 222, the pins 230 and the slots 122 constitute means for selectively connecting the circuit breaker assembly 22 to the yokes 114.

Figure 26:
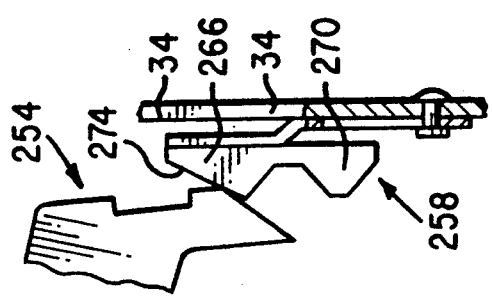
FIG. 26 is a plan view of the trip lever and the ramp mechanism with the apparatus in the "preconnect" condition.
Figure 25:
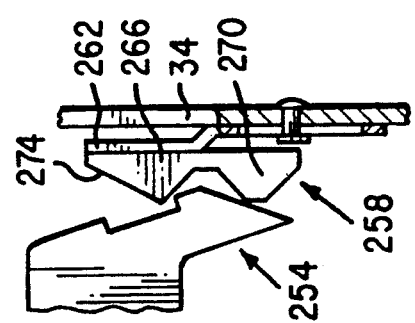
FIG. 25 is a plan view of the trip lever and the ramp mechanism with the apparatus in the "store" condition.
Figure 24:
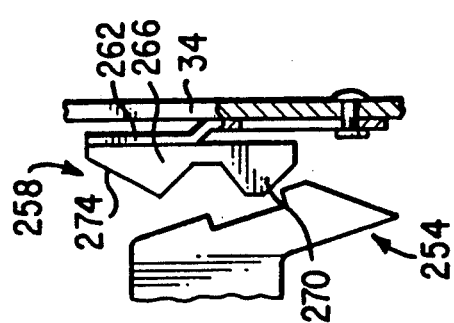
FIG. 24 is a plan view of the trip lever and the ramp mechanism with the apparatus in either the "disconnect" or "test" condition.
Figure 23:
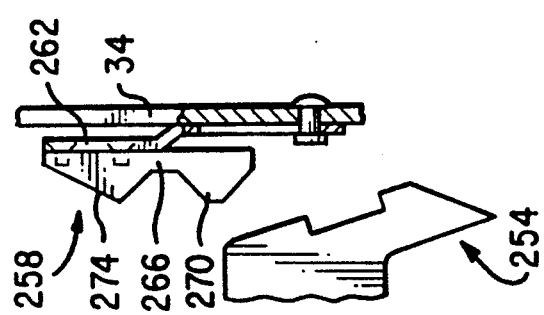
FIG. 23 is a plan view of the trip lever and the ramp mechanism with the apparatus in the "withdrawn" condition.

The circuit breaker assembly 22 also includes a conventional trip lever 254 (FIG. 19) which is pivotally mounted on the right side wall 206 of the circuit breaker 194 and which extends through a slot 256 in the right side wall 182 of the circuit breaker assembly 22. The trip lever 254 is movable between an outer position (FIGS. 23-25) and an inner position (FIG. 26). The trip lever 254 is operably connected to the circuit breaker 194 so that movement of the trip lever 254 to the inner position trips the circuit breaker 194 and so that the circuit breaker 194 cannot be closed until the trip lever 254 returns to the outer position. The trip lever 254 is biased outwardly or toward its outer position in a conventional manner.

The circuit breaker assembly 22 is movable relative to the compartment 18 between a withdrawn position (FIGS. 1 and 3) in which the circuit breaker assembly 22 is at least partially supported on the forward rails 82 and the pins 230 are located forwardly of the slots 122 when the yokes 114 are in their forward positions, a test or intermediate position (FIGS. 4 and 5) in which the upper ends of the vertical members 222 engage the stop surfaces 66 on the limit brackets 50 when the vertical members 222 are in their upper positions, and in which the pins 230 are vertically aligned with the slots 122 when the yokes 114 are in their forward positions, and an engaged position (FIGS. 6-8) in which the primary contacts 46 and 198 are in engagement.

The apparatus 10 also comprises means for moving the trip lever 254 to its inner or tripped position in response to movement of the circuit breaker assembly 22 to and from the engaged position. This means preferably includes a ramp mechanism 258 (FIGS. 9 and 23-27) mounted on the right side wall 34 of the compartment 18 for forward and rearward translational movement relative thereto. The ramp mechanism 258 includes an L-shaped member 262 movably mounted on the side wall 34, and a ramp member 266 fixed to the L-shaped member 262. The ramp member 266 includes forward and rearward substantially V-shaped ramp portions or projections 270 and 274, respectively. Engagement of the trip lever 254 by either of the inward projections 270 and 274 of the ramp member 266 moves the trip lever 254 to its inner position.

The means for moving the trip lever 254 also includes means for moving the ramp mechanism 258 relative to the compartment frame 26. Preferably, this means includes the right gusset lever 130, and means for moving the ramp mechanism 258 in response to movement of the right gusset lever 130. While various suitable means for moving the ramp mechanism 258 can be employed, in the preferred embodiment, such means includes a slot 278 (FIG. 9) in the L-shaped member 262 of the ramp mechanism 258, and a pin 282 extending inwardly from the right lever 142 and into the slot 278. The pin 282 and the slot 278 are located such that upward pivotal movement of the right gusset lever 130 causes forward movement of the ramp mechanism 258 and downward pivotal movement of the right gusset lever 130 causes rearward movement of the ramp mechanism 258.

The apparatus 10 has six different operating conditions. In the withdrawn condition (FIG. 3), the circuit breaker assembly 22 is located in its withdrawn position, the bail 234 is in its lower position, the pins 230 are higher than the yokes 114 and forward of the slots 122, the gusset levers 130 are in their lower positions, the operating handle 98 is in its lower position, the yokes 114 are in their forward positions, and the trip lever 254 is located in front of the ramp member 266. In the disconnect condition (FIG. 4), the circuit breaker assembly 22 is located in its intermediate position, the bail 234 is in its lower position, the upper ends of the vertical members 222 engage the stop surfaces 66, the pins 230 are vertically aligned with and above the slots 122, the gusset levers 130 are in their lower positions, the operating handle 98 is in its lower position, the yokes 144 are in their forward positions, and the trip lever 254 is located in front of the ramp member 266. In the store condition (FIG. 8), the circuit breaker assembly 22 is located in its intermediate position, the bail 234 is in its lower position, the upper ends of the vertical members 222 engage the stop surfaces 66, the pins 230 are higher than the yokes 114 and forward of the slots 122, the gusset levers 130 are in their upper positions, the operating handle 98 is in its upper position, the yokes 114 are in their rearward positions, and the trip lever 254 is located between the projections 270 and 274 of the ramp member 266.

In the test condition (FIG. 5), the circuit breaker assembly 22 is in its intermediate position, the bail 234 is in its upper position, the upper ends of the vertical members 222 are beneath the limit brackets 50, the pins 230 are in the slots 122, the gusset levers 130 are in their lower positions, the operating handle 98 is in its lower position, the yokes 114 are in their forward positions, and the trip lever 254 is located in front of the ramp member 266. In the preconnect condition (FIG. 6), the circuit breaker assembly 22 is in its engaged position, the bail 234 is in its upper position, the pins 230 are in the slots 122, the gusset levers 130 are in their lower positions, the operating handle 98 is in its upper position, the yokes 114 are in their rearward positions, and the trip lever 254 engages the rearward projection 274 of the ramp member 266. In the connect condition (FIG. 7), the circuit breaker assembly 22 is in its engaged position, the bail 234 is in its upper position, the pins 230 are in the slots 122, the gusset levers 130 are in their upper positions, the operating handle 98 is in its upper position, the yokes 114 are in their rearward positions, and the trip lever 254 is located rearwardly of the ramp member 266.

Figure 16:
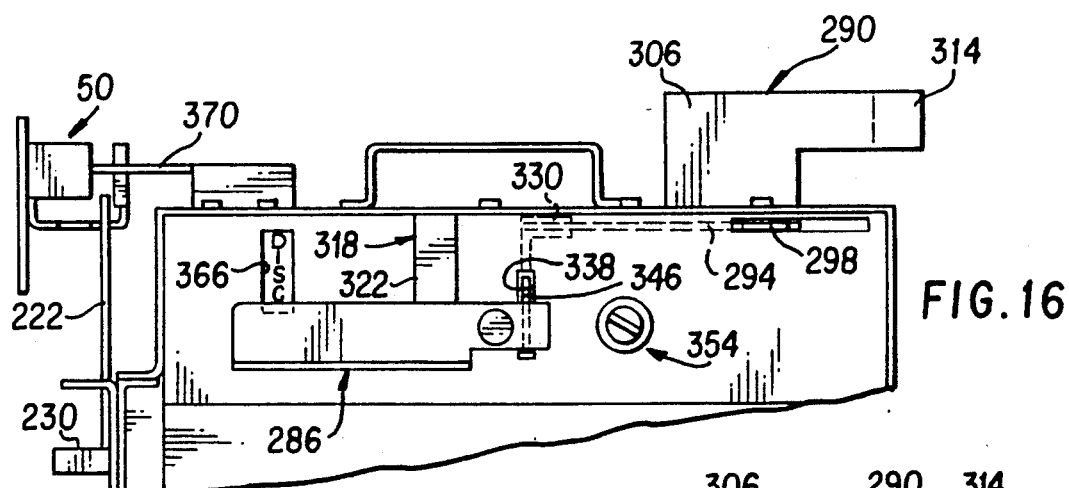
FIG. 16 is a partial front elevational view of the circuit breaker assembly as shown in FIG. 15.
Figure 17:
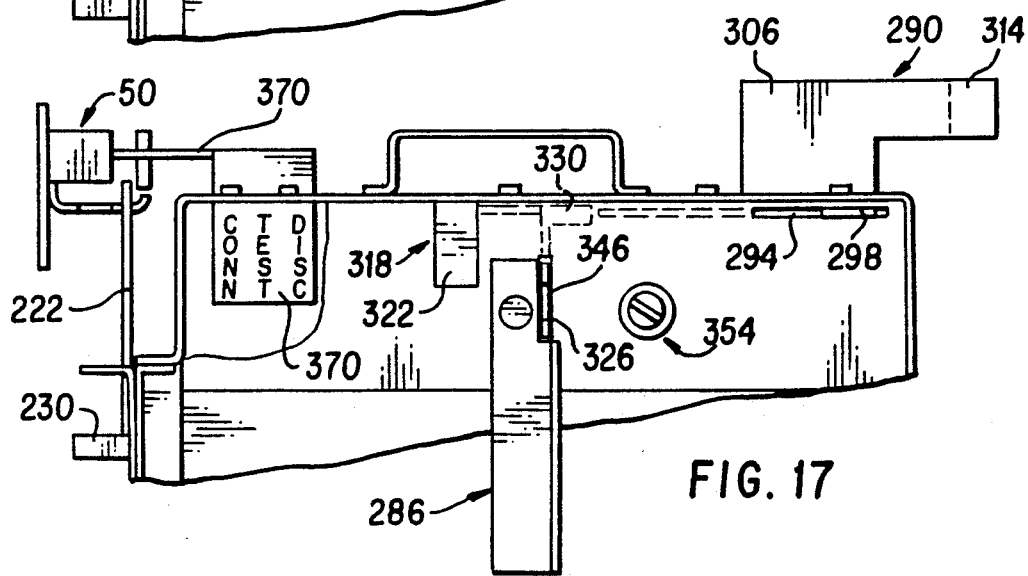
FIG. 17 is a view similar to FIG. 16 with the slide member in its right position and the locking member in its vertical position.
Figure 18:
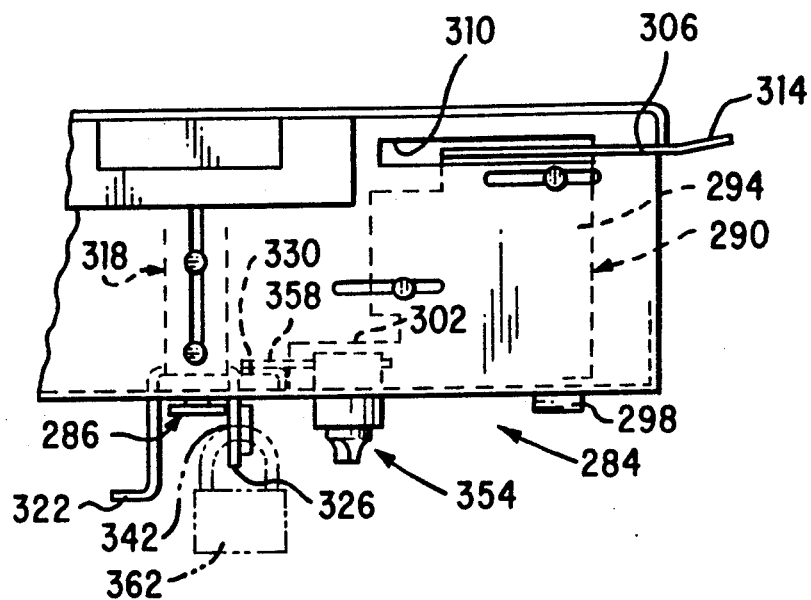
FIG. 18 is a partial plan view of the circuit breaker assembly as shown in FIG. 17.

The apparatus 10 also comprises means 284 for selectively preventing closing of the circuit breaker 194. Preferably, this means includes a locking member 286 movable between a horizontal or unlocking position (FIGS. 15 and 16) wherein the locking member 286 permits upward movement of the circuit breaker operating lever 214 to its closed or upper position, and a vertical or locking position (FIGS. 17 and 18) wherein the locking member 286 prevents upward movement of the operating lever 214 to its closed position. The means 284 further includes a slide member 290 mounted on the upper wall 186 of the circuit breaker assembly 22 for translational movement relative thereto between a first position (FIGS. 15 and 16) and a second position (FIGS. 17 and 18). The slide member 290 includes a substantially horizontal portion 294 having thereon a forwardly extending tab 298 extending outwardly of the front wall 174 of the frame 170. The horizontal portion 294 also has thereon a laterally extending projection 302. The slide member 290 also includes a generally vertical portion 306 extending upwardly through a slot 310 in the top wall 174 of the frame 170 and having thereon a laterally extending projection 314. The slide member 290 is manually movable by moving the tab 298 left or right, as shown in the drawings. When the slide member 290 is in its second position, engagement of the right limit bracket 50 by the lateral projection 314 of the slide member 290 prevents movement of the circuit breaker assembly 22 either to or from the engaged position. Thus, the slide member 290 and the right limit bracket 50 provide means for preventing movement of the circuit breaker assembly 22 to and from the engaged position when the slide member 290 is in its second position.

The means 284 further includes means for preventing movement of the locking member 286 to its locking position unless the slide member 290 is in its second position. While various suitable means can be employed, in the preferred embodiment, such means includes a hasp 318 (FIG. 18) mounted on the upper wall 174 of the circuit breaker assembly 22 for forward and rearward translational movement relative thereto between a forward position (shown in FIG. 18) and a rearward position (not shown). The hasp 318 includes a first or left forwardly extending projections 322, a second or right forwardly extending projection 326, and a laterally extending third projection 330. The left projection 322 extends outwardly through a slot in the front wall 174 of the circuit breaker assembly 22. The right projection 326 is recessed within a slot 338 in the front wall 174 of the circuit breaker assembly 22 when the hasp 318 is in its rearward position and extends outwardly out of the front wall 174 of the circuit breaker assembly 22 when the hasp 318 is in its forward position. The right projection 326 has therein an aperture 342 and has thereon, adjacent its upper end, a forwardly extending tab 346 (FIG. 1). The third projection 330 is located behind the front wall 174 of the circuit breaker assembly 22 and engages the front wall 174 to limit forward movement of the hasp 318. The means for preventing movement of the locking member 286 also includes a spring 350 (FIG. 15) extending between the assembly frame 170 and the hasp 318 and biasing the hasp 318 forwardly.

When the locking member 286 is in its horizontal position, the tab 346 on the right projection 326 extends above the right end of the locking member 286 and prevents movement of the locking member 286 to its vertical position. If the slide member 290 is in its left or retracted position, the lateral projection 302 on the slide member 290 is located in front of the third projection 330 on the hasp 318 and prevents forward movement of the hasp 318 under the influence of the spring 350. In order to move the locking member 286 to its vertical position, the hasp 318 is moved rearwardly by pushing the left projection 322 rearwardly. This moves the tab 346 rearwardly so that the tab 346 no longer prevents pivotal movement of the locking member 286. The locking member 286 can then be moved to its vertical position. While the locking member 286 is moving from its horizontal position to its vertical position, the right end of the locking member 286 blocks the slot 338 (and thus the projection 326) so that the hasp 318 cannot move forwardly. When the locking member 286 reaches its vertical position, the locking member 286 clears the slot 338 and permits forward movement of the hasp 318 to its forward position under the influence of the spring 350. When the hasp 318 is in its forward position, the aperture 342 is located forwardly of the front wall 174 and the hasp 318 prevents movement of the locking member 286 from its vertical position. Also, when the hasp 318 is in its forward position, the third projection 330 prevents movement of the slide member 290 to its first position.

Figure 15:
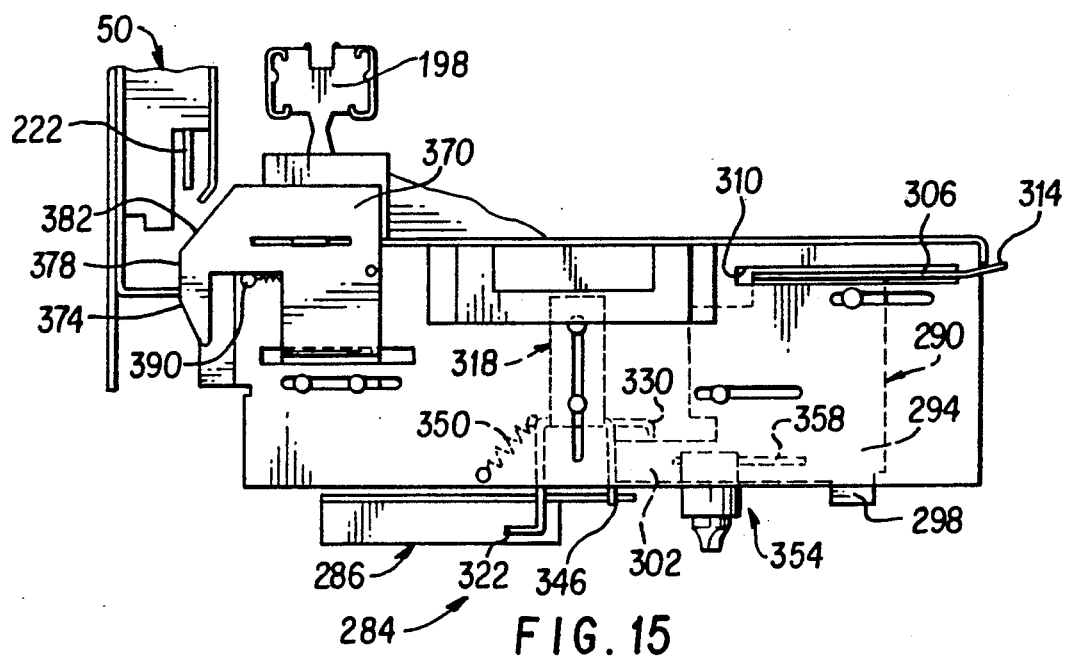
FIG. 15 is a partial plan view of the circuit breaker assembly with the slide member in its left position and the locking member in its horizontal position.

The means 284 also includes means for locking the locking member 286 in its locking position. While various suitable means can be used, in the illustrated construction, such means includes a conventional key lock 354 on the front wall 174 of the circuit breaker assembly 22. The key lock 354 includes a bolt 358 movable between an extended or left position (FIG. 18) and a retracted or right position (FIG. 15). When the hasp 318 is in its rearward position, the third projection 330 prevents movement of the bolt 358 to the left or to its extended position. When the hasp 318 is in its forward position, the bolt 358 is movable to its extended or left position. When in its left position, the bolt 358 is located behind the third projection 330 and thereby prevents rearward movement of the hasp 318. Preferably, the locking means also includes a padlock 362. The padlock 362 is insertable into the aperture 342 in the right projection 326. When in the opening 342, the padlock 362 engages the front wall 174 of the assembly 22 so as to prevent rearward movement of the hasp 318.

The apparatus 10 also comprises means for permitting movement of the circuit breaker assembly 22 to the engaged position in response to movement of the bail 234 to its upper position. In the preferred embodiment, this means includes the vertical bars 222 and the means for moving the vertical bars 222 in response to movement of the bail 234. As explained above, movement of the bail 234 to its upper position moves the vertical members 222 to their lower positions, and this in turn permits the vertical members 222 to move beneath the horizontal portions 62 of the limit brackets 50 so that the circuit breaker assembly 22 can move to its engaged position. Furthermore, when the vertical members 222 are located beneath the horizontal portions 62 of the limit brackets 50, the horizontal portions 62 define stop surfaces that prevent movement of the vertical members 222 to their upper positions. Thus, the horizontal portions 62 prevent movement of the vertical members 222 from their lower positions when the circuit breaker assembly 22 is in its engaged position.

Figure 11:
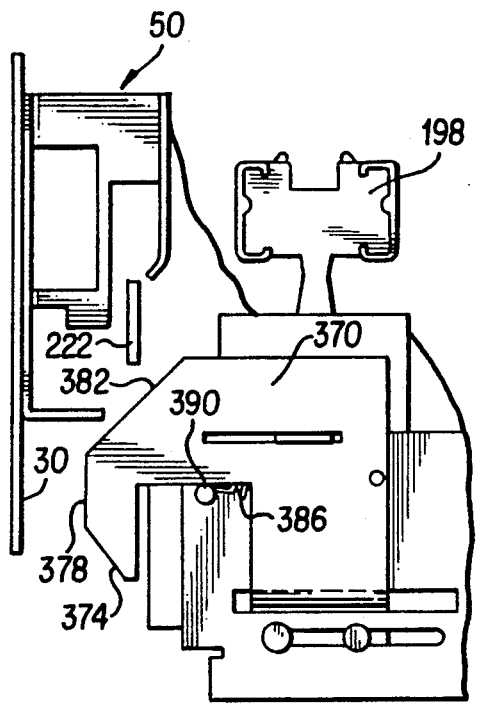
FIG. 11 is a partial plan view of the circuit breaker assembly in the "withdrawn" condition.
Figure 12:
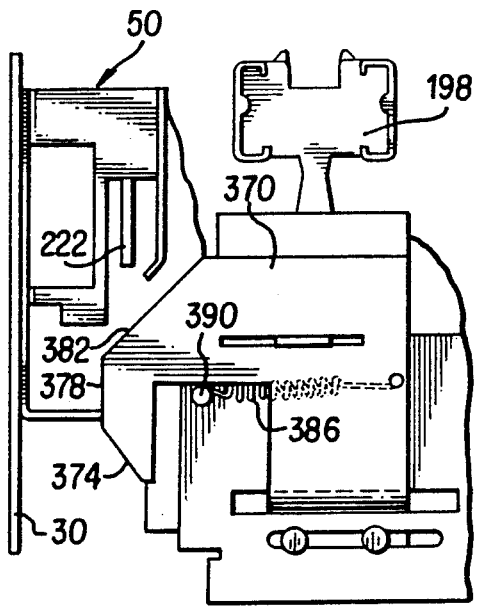
FIG. 12 is a partial plan view of the circuit breaker assembly in the "disconnect" condition.
Figure 13:
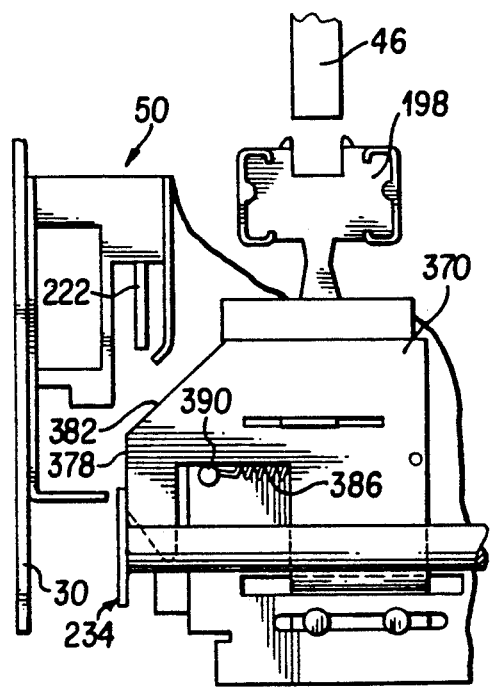
FIG. 13 is a partial plan view of the circuit breaker assembly in the "test" condition.

The apparatus 10 also comprises means for indicating the position of the circuit breaker assembly and/or the condition of the apparatus 10. While various suitable means can be used, in the illustrated construction, such means includes a window 366 (FIG. 1) in the front wall 174 of the circuit breaker assembly 22, and an indicator or cam member 370 (FIGS. 11-17) which is visible through the window 366, which has thereon (see FIG. 17) the indicia "DISC," "TEST" and "CONN", which includes forward, outer and rearward cam surfaces 374, 378 and 382, respectively, and which is movably supported by the circuit breaker assembly frame 170 for translational movement relative to first, second, third and fourth positions. When the indicator 370 is in its first position (FIG. 11), no indicia is visible in the window 366. When the indicator 370 is in its second (FIG. 12), third (FIG. 13) and fourth (FIG. 14) positions, the indicia "DISC," "TEST" and "CONN" are respectively visible in the window 366. The indicating means also includes means for biasing the indicator or cam member 370 to the left or to its first position. While various suitable biasing means can be employed, in the preferred embodiment, such means includes a spring 386 extending between the cam member 370 and a projection 390 on the upper wall 186 of the circuit breaker assembly 22.

The apparatus 10 also comprises first means for moving the cam member or indicator 370 to the right or to its second position in response to movement of the circuit breaker assembly 22 to its intermediate position. Preferably, this means includes the inward projection 58 on the left limit bracket 50. As the indicator 370 moves rearwardly during movement of the circuit breaker assembly 22 to its intermediate position, the inward projection 58 on the left limit bracket 50 engages the rearward cam surface 382 and then the outer cam surface 378 (see FIG. 12) on the indicator 370 and thereby moves the indicator 370 to its second position.

The apparatus 10 also comprises second means for moving the cam member or indicator 370 to the right or to its third position in response to movement of the circuit breaker assembly secondary contacts 226 into engagement with the compartment secondary contacts 126, i.e., when the apparatus 10 is put into the test condition. Preferably, this means includes the bail 234. More particularly, as the the bail 234 moves to its upper position, the bail 34 engages the forward cam surface 374 and then the outer cam surface 378 on the cam member 370 and thereby moves the cam member 370 to its third position.

Figure 14:
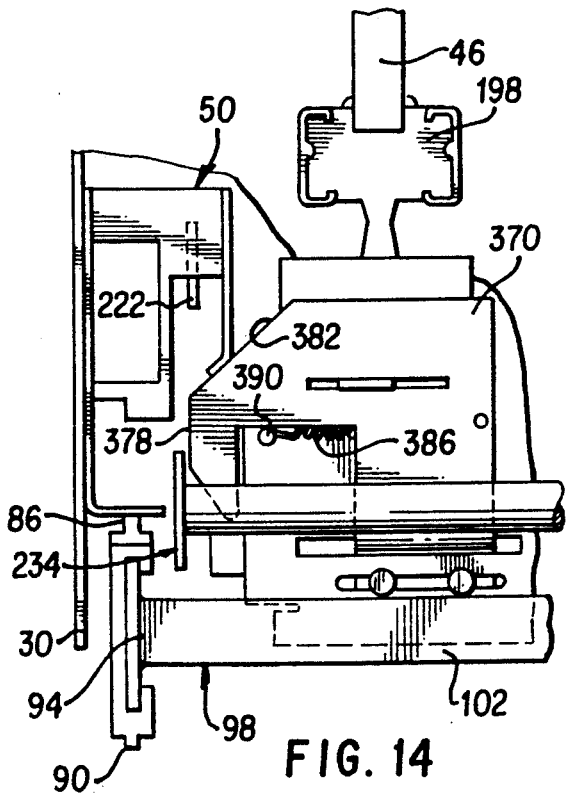
FIG. 14 is a partial plan view of the circuit breaker assembly in the "connect" condition.

The apparatus 10 further comprises third means for moving the indicator or cam member 370 to the right or to its fourth position in response to movement of the circuit breaker assembly 22 to its engaged position. Preferably, this means includes the forward end of the upward projection 70 on the left limit bracket 50. As shown in FIG. 14, the forward end of the projection 70 engages the rearward cam surface 382 on the cam member 370 in response to movement of the circuit breaker assembly 22 to its engaged position.

Figure 21:
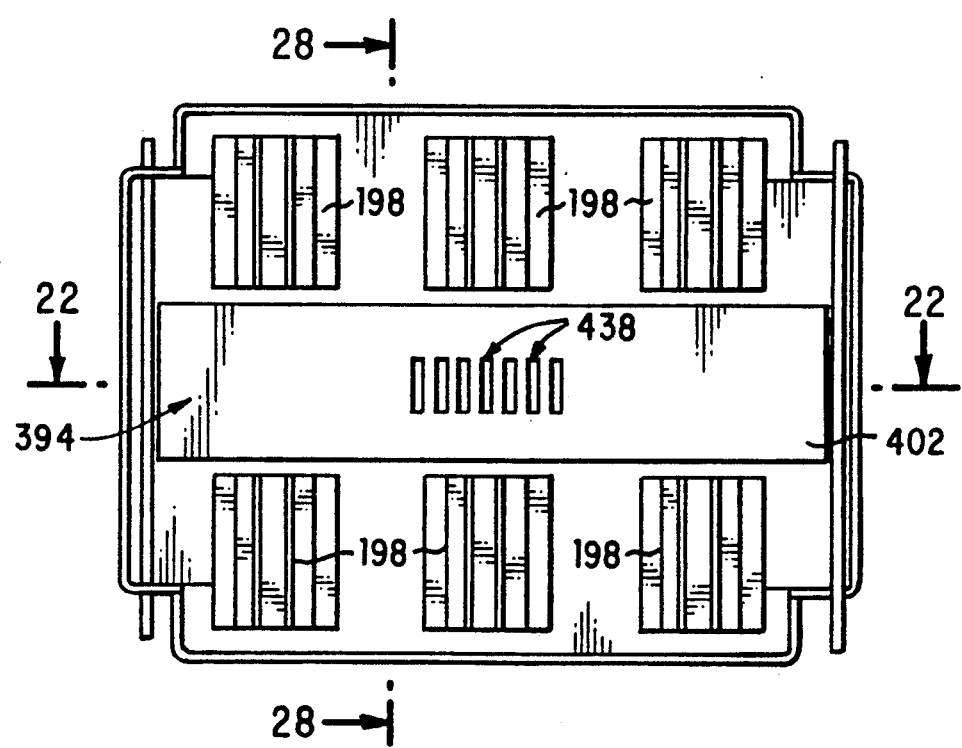
FIG. 21 is a rear elevational view of the circuit breaker assembly.
Figure 28:
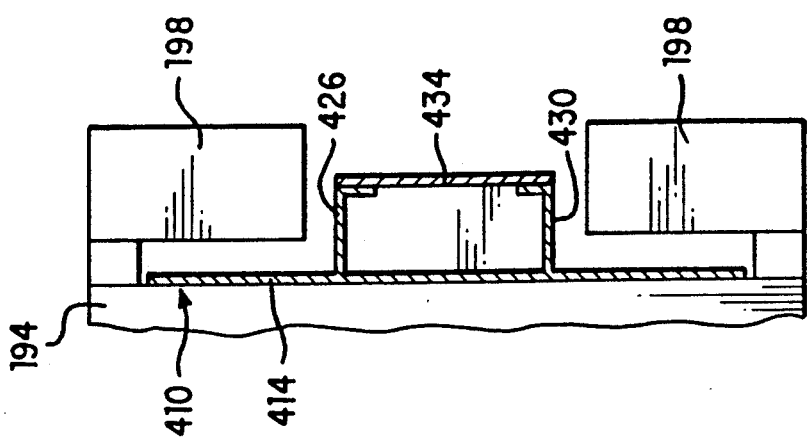
FIG. 28 is a view taken along line 28—28 in FIG. 21.
Figure 22:
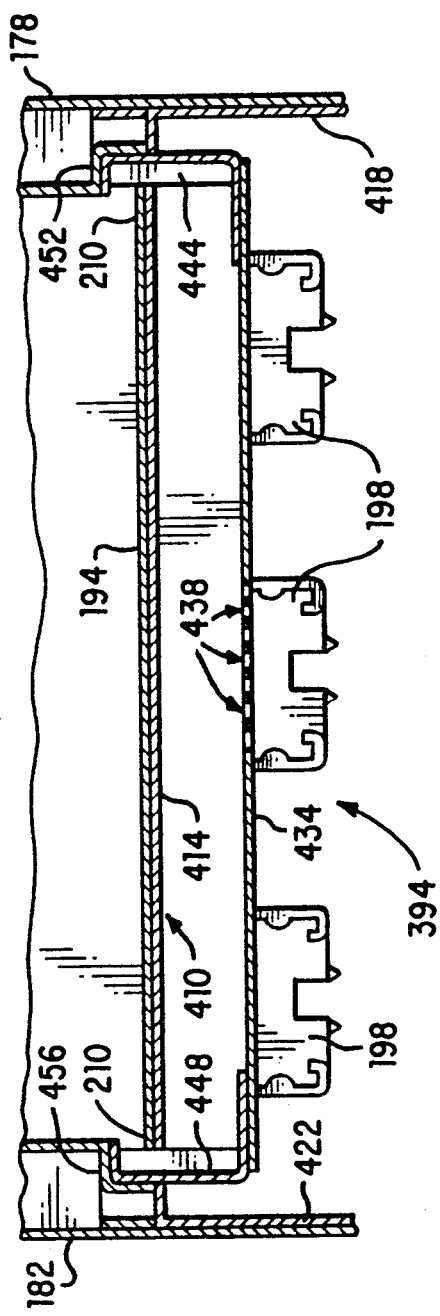
FIG. 22 is a view taken along line 22—22 in FIG. 21.
Figure 27:
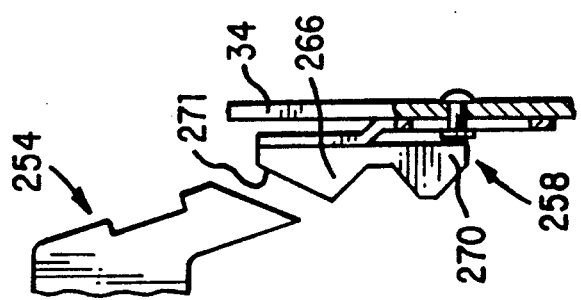
FIG. 27 is a plan view of the trip lever and the ramp mechanism with the apparatus in the "connect" condition.

The apparatus 10 also comprises insulated exhaust chamber means 394 (FIG. 21) communicating with the vents 210. While various suitable chamber means can be employed, in the preferred embodiment, the chamber means 394 is located on the rear wall 200 of the circuit breaker 194, between the jaw mechanisms 198, and opens rearwardly to the atmosphere in the bus area of the switchboard apparatus 10. More particularly, the chamber means 394 includes a housing member 410 (FIG. 22) secured to the rear wall 200 of the circuit breaker 194 and secured to the side walls 178 and 182 of the circuit breaker assembly 22. The housing member 410 includes a main portion 414 secured to the rear wall 200 of the circuit breaker 194, horizontally spaced left and right side portions 418 and 422 which extend rearwardly from the main portion 414 and which are respectively secured to the side walls 178 and 182 of the circuit breaker assembly 22, and vertically spaced, L-shaped portions 426 and 430 extending rearwardly from the main portion 414. The main portion 414 has therein openings 431 and 432 located adjacent the side portions 418 and 422, respectively. The chamber means 394 also includes a vent plate 434 which is made of an insulating material, which is secured to the L-shaped portions 426 and 430 of the housing member 410, and which has therein vent openings 438 (FIG. 22) communicating with the atmosphere. The chamber means 394 also includes left and right insulated duct members 444 and 448, respectively. Each duct member communicates with the associated vent 210, extends through the associated opening 431 or 432 in the housing member 410, and directs exhaust gases rearwardly and then inwardly into the space defined by the housing member 410 and the vent plate 434. The chamber means 394 also includes a left and right mounting brackets 452 and 456 respectively mounted on the side walls 178 and 182 of the circuit breaker assembly 22. Each mounting bracket 452 or 456 extends between the associated side wall 178 or 182 and the associated duct member 444 or 448 so as to secure the associated duct member 444 or 448 in position.

Gases exiting the circuit breaker 194 through the vents 210 are directed rearwardly into the space defined by the housing member 410 and the vent plate 434. From this space, the gases pass rearwardly through the vent openings 438 and into the atmosphere. In the preferred embodiment, the vent plate 434 and the duct members 444 and 448 are insulated, but the housing member 410 is not. Thus, the chamber means 394 is actually partially insulated. If desired, the housing member 410 could be made of an insulating material, so that the entire chamber means 394 would be insulated. The exhaust chamber means 394 cools and de-ionizes gases exhausted during arcing of the circuit breaker 194, so that these gases can be safely discharged into the atmosphere.

In the preferred embodiment, the exhaust chamber means 394 is directly supported solely by the circuit breaker assembly frame 170. In other words, no portion of the exhaust chamber means 394 is directly supported or defined by the compartment 18.

The apparatus 10 operates as follows. When the gusset levers 130 are in their lower positions, the handle 98 is in its lower position, and the bail 234 is in its lower position, as shown in FIG. 3, the circuit breaker assembly wheels 218 are located on the forward and rearward rails 82 and 78 in order to locate the circuit breaker assembly 22 in its withdrawn position. At this point, the trip lever 254 is located forwardly of the ramp member 266 and the cam member 370 indicates the withdrawn condition. Next, the circuit breaker assembly 22 is pushed inwardly to its intermediate position, i.e., until the upper ends of the vertical members 222 engage the stop surfaces 66, so that the apparatus 10 is in the disconnect condition (FIG. 4). This movement of the circuit breaker assembly 22 causes the cam member 370 to engage the limit bracket 50, so that the cam member 370 moves to its second position and the indicia "DISC" is visible in the window 366. This movement of the circuit breaker assembly 22 also moves the pins 230 into vertical alignment with the slots 122. In the disconnect condition, the trip lever 254 is still located forwardly of the ramp member 266, and engagement of the stop surfaces 66 by the vertical members 222 prevents movement of the circuit breaker assembly 22 to the engaged position.

From the disconnect condition, the apparatus 10 can be put into either the store condition or the test condition. To put the apparatus 10 into the store condition (FIG. 8), the handle 98 is moved to its upper position and the gusset levers 130 are moved to their upper positions. Upward movement of the handle 98 moves the yokes 114 to their rearward positions, but the circuit breaker assembly 22 does not move with the yokes 114 because the pins 230 are not located in the slots 122. Upward movement of the gusset levers 130 to their upper positions moves the ramp member 266 forwardly. During forward movement of the ramp member 266, the trip lever 254 engages the forward projection 270 on the ramp member 266 (this trips the circuit breaker 194) and then becomes located between the projections 270 and 274 of the ramp member 266. In this location, the trip lever 254 is in its outer position. In the store condition, the cam member 370 still indicates "DISC". In other words, the indicating means does not distinguish between the disconnect condition and the store condition. In the store condition, engagement of the stop surfaces 66 by the bars 222 prevents movement of the circuit breaker assembly 22 to the engaged position.

To change the apparatus 10 from the disconnect condition to the test condition (FIG. 5), the gusset levers 130 and the operating handle 98 are left in their lower positions, but the bail 234 is moved to its upper position. Upward movement of the bail 234 moves the pins 230 into tee slots 122, moves the cam member 370 to its third position so that the indicia "TEST" is visible in the window 366, and moves the secondary contacts 226 into engagement with the secondary contacts 126. The trip lever 254 remains located forwardly of the ramp member 266.

From the test condition, the apparatus is put into the preconnect condition (FIG. 6) by moving the operating handle 98 to its upper position. Such movement of the operating handle 98 causes rearward movement of the yokes 114, and, because the pins 230 are located in the slots 122, moves the circuit breaker assembly 22 to the engaged position. During this movement of the circuit breaker assembly 22, the cam member 370 moves to its fourth position and the indicia "CONN" is visible in the window 366. This movement of the circuit breaker assembly 22 also moves the trip lever 254 over the forward projection 270 of the ramp member 266 and onto the rearward projection 274, so that the circuit breaker 194 is tripped. Thus, the apparatus 10 comprises means for moving the trip lever 254 to its open or tripped or inner position in response to movement of the circuit breaker assembly 22 to the engaged position.

From the preconnect condition, the apparatus 10 is put into the connect condition (FIG. 7) by moving the gusset levers 130 to their upper positions. Such movement of the gusset levers 130 moves the ramp member 266 forwardly so that the trip lever 254 becomes located rearwardly of the ramp member 266 and is in its outer position. Thus, the apparatus 10 comprises means for selectively opening and permitting closing of the circuit breaker 194 in response to pivotal movement of the right gusset lever 130, and means for permitting closing of the circuit breaker 194 when the circuit breaker assembly 22 is in the engaged position and the right gusset lever 130 is in its upper position. Upward movement of the gusset levers 130 also moves the inward extensions 158 on the levers 142 to positions in which the extensions 158 are located forwardly of the projections 190 on the side walls and in which the extensions 158 thereby prevent forward movement of the circuit breaker assembly 22. Thus, apparatus 10 comprises means for retaining the circuit breaker assembly 22 in the engaged position when the gusset levers 130 are in their upper positions. In the connect condition, the cam member 370 still indicates "CONN". In other words, the indicating means does not distinguish between the preconnect condition and the connect condition.

When the gusset levers 130 are moved from their upper positions to their lower positions, i.e., when the apparatus is changed from the connect condition to the preconnect condition, the ramp member 266 moves rearwardly so that the trip lever 254 engages the rearward projection 274 of the ramp member 266, thereby tripping the circuit breaker 194. Accordingly, the apparatus 10 comprises means for opening the circuit breaker 194 when the circuit breaker assembly 22 is in the engaged position and the right gusset lever 130 is in its lower position.

When the circuit breaker assembly 22 moves from the engaged position to the test position, i.e., when the apparatus is changed from the preconnect condition to the test condition, the trip lever 254 again engages the ramp member 266 and thereby trips the circuit breaker 194. Thus, the apparatus 10 comprises means for moving the trip lever 254 to its tripped or open or inner position in response to movement of the circuit breaker assembly 22 from the engaged position.

If desired, the above-described indicating means can distinguish between the disconnect condition and the store condition and between the preconnect condition and the connect condition. This could be done by providing the cam member 370 with separate indicia for the store condition and the connect condition and by providing the apparatus 10 with means for moving the cam member 370 to a fifth position in which the indicia for the store condition is visible in the window 366 when the apparatus 10 is in the store condition, and means for moving the cam member 370 to a sixth position in which the indicia for the connect condition is visible in the window 366 when the apparatus 10 is in the connect condition.

Various features of the invention are set forth in the following claims.

We claim:

1. An apparatus comprising
   a compartment including a frame, a pair of compartment primary contacts supported by said frame, a rearward rail which is fixed to said frame in a substantially horizontal plane, said rearward rail having an upper track, a lower track, and an inner track and an end;
   a forward rail having an upper track, a lower track, and an inner track, said forward rail being pivotally attached to said frame for facilitating movement relative thereto between a horizontal position wherein said forward rail extends forwardly from said end of said rearward rail and in substantially collinear relation to said rearward rail, and a vertical position wherein said forward rail extends in transverse relation to said end of said rearward rail;
   a gusset lever pivotally mounted on said frame for movement between an upper position and a lower position and having an inward extension for supporting said forward rail in its said horizontal position; and
   a drawout circuit breaker assembly including a circuit breaker having thereon a pair of circuit breaker primary contacts, said assembly being movable along said inner tracks of said rearward and forward rails when said forward rail is in said horizontal position by means of a yoke movably mounted on said upper and lower tracks of said rearward and forward rails, being movable along said rearward rail so as to move said circuit breaker assembly primary contacts into and out of engagement with said compartment primary contacts, and being movable entirely onto said rearward rail so that said forward rail is movable from said horizontal position to said vertical position when said circuit breaker primary contacts are disengaged from said compartment primary contacts.

2. An apparatus as set forth in claim 1 and further comprising a link, pivotally connected to said forward rail and said yoke, for translating pivotal movement of said forward rail into linear movement of said circuit breaker assembly along said rearward rail so as to move said circuit breaker assembly primary contacts into and out of engagement with said compartment primary contacts.

3. An apparatus as set forth in claim 2 and further comprising an operating handle slidably received in said inner track of said forward rail for linear movement along said inner track and for common pivotal movement with said forward rail.

4. An apparatus as set forth in claim 3 wherein said operating handle is removably connected to said forward rail by an operating handle retainer which is spring biased to engage a hole in said forward rail, whereby said operating handle may be removed from said forward rail to facilitate removal of said circuit breaker assembly from said compartment by disengaging said operating handle retainer from said hole and sliding said operating handle out of said inner track of said forward rail.

5. An apparatus as set forth in claim 1 and further comprising a lever pivotally mounted on said frame, a limit bracket mounted on said frame for limiting pivotal movement of said lever between a vertical position and a horizontal position, said gusset lever being pivotally mounted on said frame for substantially common pivotal movement with said lever from a raised vertical position to a lowered horizontal position said gusset lever being prohibited from movement beyond a 90° arc by a pin extending inboard from said gusset lever and engaging a slot in said lever.

6. An apparatus as set forth in claim 1 further comprising means for selectively opening and permitting closing of said circuit breaker in response to pivotal movement of said gusset lever.

7. An apparatus comprising
a drawout circuit breaker assembly including a pair of circuit breaker primary contacts;
a compartment including a frame, a pair of compartment primary contacts supported by said frame, and an operating handle pivotally mounted on said frame independently of said circuit breaker assembly;
means for moving said circuit breaker assembly linearly along a horizontal axis relative to said frame so as to move said circuit breaker assembly primary contacts into and out of engagement with said compartment primary contacts in response to pivotal movement of said operating handle;
a link having a first end pivotally connected to said operating handle and a second end pivotally connected to said means for moving; and
means for selectively connecting said means for moving to said circuit breaker assembly for common movement therewith.

8. An apparatus as set forth in claim 7 wherein said operating handle pivotal movement is limited to a range of approximately 90° by a limit bracket and a gusset lever which form stops for said operating handle, said limit bracket and said gusset lever being mounted on said frame.

9. An apparatus as set forth in claim 7 wherein said means for moving said circuit breaker assembly further includes a yoke connected to said second end of said link and movable along said horizontal axis;
a vertical member slidably mounted on said circuit breaker assembly, said vertical member including an outward extending pin for engaging a slot in said yoke for transferring the linear movement of said yoke to said circuit breaker assembly and a forwardly extending fixed member having a slot for receiving vertical movement from said means for selectively connecting said circuit breaker assembly to said yoke, from said circuit breaker assembly thereby permitting pivotal movement of said operating handle without moving said circuit breaker primary contacts into and out of engagement with said compartment primary contacts.

10. An apparatus as set forth in claim 9 wherein said means for selectively connecting said circuit breaker assembly to said yoke includes a bail, pivotally mounted on said circuit breaker assembly, and rotatably movable from a lower position to an upper position, said bail having a pin for communicating with said slot in said forwardly extending member of said vertical member, thereby permitting said pin of said vertical member to engage said slot in said yoke when said bail is in said second upper position and disengage said slot in said yoke when said bail is in said lower position.

11. An apparatus as set forth in claim 10 wherein said compartment also includes a pair of secondary contacts located on an internally extending flange at the bottom of said yoke, and wherein said circuit breaker assembly also includes a pair of secondary contacts located on the lower end of said vertical member, whereby said breaker assembly secondary contacts and said compartment secondary contacts are engaged and disengaged in response to movement of said bail.

12. An apparatus comprising
a compartment including a frame, a pair of primary contacts supported by said frame;
a limit bracket mounted on said frame having first and second stop surfaces; and
a drawout circuit breaker assembly movable relative to said frame between a disengaged position and an engaged position, said circuit breaker assembly and movable relative to said compartment frame, means for moving said yoke, a pair of primary contacts which are supported by said circuit breaker assembly frame and which are out of engagement with said compartment primary contacts when said assembly, is in said disengaged position and are engaged with said compartment primary contacts when said assembly is in said engaged position, a vertical member, slidably mounted on said circuit breaker assembly frame for movement relative thereto between an upper position wherein said vertical member engages said first stop surface so as to prevent movement of said circuit breaker assembly to said engaged position, and a lower position wherein said vertical member permits movement of said circuit breaker assembly to said engaged position and wherein said second stop surface prevents movement of said vertical member from said lower position when said circuit breaker assembly is in said engaged position, and means for moving said vertical member.

13. An apparatus as set forth in claim 12 wherein said compartment also includes a pair of secondary contacts supported by said compartment frame, wherein said circuit breaker assembly includes a pair of secondary contacts which are mounted on said vertical member and which are engageable with said compartment secondary contacts, and wherein said circuit breaker secondary contacts are engaged with said compartment secondary contacts when said vertical member is in said lower position.

14. An apparatus as set forth in claim 12 and further comprising a rearward rail attached to said compartment frame along a horizontal axis and having an end, a forward rail pivotally connected to said compartment frame at said end of said rearward rail, a yoke supported by said rearward and forward rails and moveable along said horizontal axis, a link pivotally connecting said yoke to said second rail, means for moving said yoke along said horizontal axis, and means for selectively connecting said circuit breaker assembly to said yoke in response to movement of said vertical member to said lower position.

15. An apparatus as set forth in claim 14 wherein said means for selectively connecting said circuit breaker assembly to said yoke includes a slot located in said yoke, a pin located on said vertical member which engages said slot in response to movement of said vertical member to said lower position.

16. An apparatus as set forth in claim 15 wherein said vertical member further comprises a forwardly extending member fixed to said vertical member and having a slot therewith.

17. An apparatus as set forth in claim 16 wherein said means for moving said vertical member includes a bail pivotally mounted on said circuit breaker assembly frame for movement from a lower position to an upper position, said bail having a pin for engaging said slot in said vertical member for transmitting movement from said upper position wherein said pin on said vertical member is disengaged from said slot in said yoke to said lower position wherein said pin on said vertical member engages said slot in said yoke.

18. An apparatus comprising
a compartment including a frame, a gusset lever movably mounted on said frame, and a pair of primary contacts supported by said frame,
a drawout circuit breaker assembly including a frame, a circuit breaker supported by said circuit breaker assembly frame and having thereon a pair of primary contacts, a trip lever supported by said circuit breaker assembly for movement between an outer position wherein the circuit breaker may be closed and an inner position wherein the circuit breaker cannot be closed, said circuit breaker assembly being movable relative to said compartment frame between an engaged position wherein said circuit breaker assembly primary contacts engage said compartment primary contacts, and a disengaged position wherein said circuit breaker contacts are out of engagement with said compartment primary contacts;
means for moving said trip lever from said outer position to said inner position in response to movement of said circuit breaker assembly to and from said engaged position; and,
means for moving said trip lever from said outer position to said inner position in response to movement of said gusset lever.

19. An apparatus as set forth in claim 18 wherein said means for moving said trip lever includes a ramp member which is moveably mounted on said compartment frame and which engages said trip lever as said circuit breaker assembly moves to and from said engaged position thereby moving said trip lever from said outer position to said inner position.

20. An apparatus as set forth in claim 19 wherein said means also includes means for moving said ramp member relative to said compartment frame.

21. An apparatus as set forth in claim 20 wherein said means for moving said ramp member includes a pin on said gusset lever for engaging a slot in said ramp member and causing movement of said ramp member in response to movement to said gusset lever.

22. An apparatus as set forth in claim 21 wherein said gusset lever is pivotally movable relative to said compartment frame between a horizontal position and vertical position, wherein said ramp member engages said trip lever so that said trip lever is located in said outer position when said gusset lever is in said vertical position and said circuit breaker assembly is in said engaged position, and so that said trip lever is located in said inner position when said gusset lever is in said horizontal position and said circuit breaker assembly is in said disengaged position.

23. An apparatus comprising
a compartment including a frame, a pair of primary contacts supported by said frame, and a pair of secondary contacts supported by said frame,
a drawout circuit breaker assembly linearly movable along a horizontal axis relative to said compartment frame between a withdrawn position, a test position and an engaged position, said circuit breaker assembly including a frame, a circuit breaker which is supported by said circuit breaker assembly frame and which has thereon a pair of primary contacts linearly movable along a horizontal axis into and out of engagement with said compartment primary contacts in response to movement of said circuit breaker assembly frame into and out of said engaged position, a pair of secondary contacts which are supported by said circuit breaker assembly frame and which are vertically movable into and out of engagement with said compartment secondary contacts when said circuit breaker assembly is in said test position, an indicator moveably supported by said circuit breaker assembly frame for movement relative to a first, a second, a third and a fourth position, and means for biasing said indicator to said first position,
first means for moving said indicator to said second position in response to movement of said circuit breaker assembly to said test position,
second means for moving said indicator to said third position in response to movement of said circuit breaker assembly secondary contacts into engagement with said compartment secondary contacts, and
third means for moving said indicator to said fourth position in response to movement of said circuit breaker assembly to said engaged position.

24. An apparatus as set forth in claim 23 wherein said circuit breaker assembly also includes a bail supported by said circuit breaker assembly frame, and means for moving said circuit breaker assembly secondary contacts into and out of engagement with said compartment secondary contacts in response to movement of said bail.

25. An apparatus as set forth in claim 24 wherein said second means includes said bail.

26. An apparatus as set forth in claim 23 wherein said first and third means include a bracket which is mounted on said compartment frame and which is engageable with said indicator.

27. An apparatus comprising
a compartment including a frame, a pair of primary contacts supported by said frame, a pair of secondary contacts supported by said frame,
a yoke moveably supported by said frame along a horizontal axis,
means for selectively moving said yoke between a forward position and a rearward position along said horizontal axis,
a circuit breaker assembly including a frame slidably mounted along said horizontal axis, a pair of primary contacts engageable with said compartment primary contacts, a pair of secondary contacts engageable with said compartment secondary contacts mounted on said yoke, and a bail moveably supported by said circuit breaker assembly frame, and and means operative in response to movement of said bail for moving said circuit breaker assembly secondary contacts into engagement with said compartment secondary contacts and for connecting said circuit breaker assembly to said yoke for common movement thereof.

28. An apparatus as set forth in claim 27 wherein said circuit breaker assembly is movable in response to movement of said yoke between an engaged position wherein said circuit breaker assembly primary contacts engage said compartment primary contacts and said yoke is in said rearward position, and a disengaged position wherein said circuit breaker assembly primary contacts are out of engagement with said compartment primary contacts and said yoke is in said forward position.

29. An apparatus comprising a compartment including a frame, a limit bracket fixed to said frame, and a pair of primary contacts supported by said frame, a drawout circuit breaker assembly including a circuit breaker having an operating handle movable between a circuit open position and a circuit closed position, a frame, and a pair of primary contacts supported by said assembly frame, said circuit breaker assembly being movable between a disengaged position wherein said circuit breaker assembly primary contacts are out of engagement with said compartment primary contacts, and an engaged position wherein said circuit breaker assembly primary contacts are engaged with said compartment primary contacts, and said circuit breaker assembly further including a locking member supported by said assembly frame for movement between an unlocking position wherein said locking member permits movement of the circuit breaker operating handle to the circuit closed position, and a locking position wherein said locking member prevents movement of the circuit breaker operating handle to the circuit closed position, and a slide member supported by said frame for movement between a first position in which said slide member is not in communication with said limit bracket and thereby permits movement of said circuit breaker assembly to and from said engaged position, and a second position in which said slide member is in communication with said limit bracket and thereby prevents movement of said circuit breaker assembly to and from said engaged position, means for preventing movement of said locking member to said locking position unless said slide member is in said second position, and means for locking said locking member in said locking position.

* * * * *